US012599051B2

(12) United States Patent
Junkin et al.

(10) Patent No.: US 12,599,051 B2
(45) Date of Patent: *Apr. 14, 2026

(54) GARDEN IMPLEMENT

(71) Applicant: Botaniworld, LLC, Framingham, MA (US)

(72) Inventors: Angus Junkin, Framingham, MA (US); Michael Flaherty, Santa Clarita, CA (US)

(73) Assignee: BOTANIWORLD, LLC, Weston, MA (US)

( * ) Notice: Subject to any disclaimer, the term of this patent is extended or adjusted under 35 U.S.C. 154(b) by 383 days.

This patent is subject to a terminal disclaimer.

(21) Appl. No.: 18/352,922

(22) Filed: Jul. 14, 2023

(65) Prior Publication Data

US 2023/0354728 A1      Nov. 9, 2023

Related U.S. Application Data

(63) Continuation of application No. 17/033,548, filed on Sep. 25, 2020, now Pat. No. 11,700,780.

(51) Int. Cl.
    *A01B 1/20*      (2006.01)
    *A01B 1/22*      (2006.01)
    *A01D 7/08*      (2006.01)
(52) U.S. Cl.
    CPC ............... *A01B 1/20* (2013.01); *A01B 1/225* (2013.01); *A01B 1/227* (2013.01); *A01D 7/08* (2013.01)
(58) Field of Classification Search
    CPC ........... A01B 1/20; A01B 1/225; A01B 1/227; A01D 7/08
    See application file for complete search history.

(56) References Cited

U.S. PATENT DOCUMENTS

| | | | |
|---|---|---|---|
| 1,427,865 A | 9/1922 | Szabo | |
| 1,741,004 A | 12/1929 | Wornstaff | |

(Continued)

FOREIGN PATENT DOCUMENTS

| | | |
|---|---|---|
| CN | 101268241 A | 9/2008 |
| CN | 102802398 A | 11/2012 |

(Continued)

OTHER PUBLICATIONS

International Search Report and Written Opinion, PCT/US2020/052921, Dec. 22, 2020, 12 pgs.

(Continued)

*Primary Examiner* — Tara Mayo
(74) *Attorney, Agent, or Firm* — LOZA & LOZA, LLP; Michael I. Angert

(57)      ABSTRACT

Aspects of the disclosure relate to a garden implement that includes a handle, at least one tool member having a pair of flanges extending therefrom, each flange includes a flange bore and a pinion segment that share a common center, the pair of flanges have opposing parallel surfaces that each include the pinion segment, the opposing parallel flange surfaces are spaced apart by a first distance. Also included is at least a first fixing member coupled between the pair of flanges and the handle. The first fixing member includes a boss projecting along a longitudinal axis, the boss has parallel surfaces spaced apart by the first distance, a boss bore, and a curved rack segment projecting from the boss and configured to mesh with at least a portion of the pinion segment. Also included is a fixing shaft insertably received in at least one flange bore and the boss bore.

20 Claims, 11 Drawing Sheets

(56)        References Cited

U.S. PATENT DOCUMENTS

| | | | |
|---|---|---|---|
| 1,903,097 | A | 3/1933 | Dunford et al. |
| 3,222,699 | A | 12/1965 | Zeisig |
| 3,528,504 | A | 9/1970 | Bushmeyer |
| 4,011,612 | A | 3/1977 | Atkinson |
| 4,731,896 | A | 3/1988 | De La Tour |
| 5,871,204 | A | 2/1999 | Spirer |
| 6,315,341 | B1 | 11/2001 | Leon et al. |
| 7,836,557 | B2 | 11/2010 | Baker |
| 8,006,474 | B2 | 8/2011 | Baker |
| 8,776,909 | B2 | 7/2014 | Johnson |
| 9,096,988 | B2 | 8/2015 | Price |
| 9,302,385 | B2 | 4/2016 | Su |
| 9,775,273 | B2 | 10/2017 | Kindred |
| 10,064,620 | B2 | 9/2018 | Gettinger et al. |
| 10,104,821 | B2 | 10/2018 | Kindred |
| D836,413 | S | 12/2018 | Fragale |
| 10,688,326 | B1 | 6/2020 | Davis |
| D958,615 | S | 7/2022 | Junkin et al. |
| 2006/0138792 | A1 | 6/2006 | Heneveld, Sr. |
| 2010/0218387 | A1 | 9/2010 | Moons |
| 2015/0013503 | A1 | 1/2015 | Lee et al. |

FOREIGN PATENT DOCUMENTS

| | | | |
|---|---|---|---|
| CN | 109219343 | A | 1/2019 |
| CN | 109314289 | A | 2/2019 |
| CN | 110219897 | A | 9/2019 |
| WO | 2019210686 | A1 | 11/2019 |

OTHER PUBLICATIONS

International Preliminary Report on Patentability, PCT/US2020/052921, Apr. 13, 2022, 34 pgs.

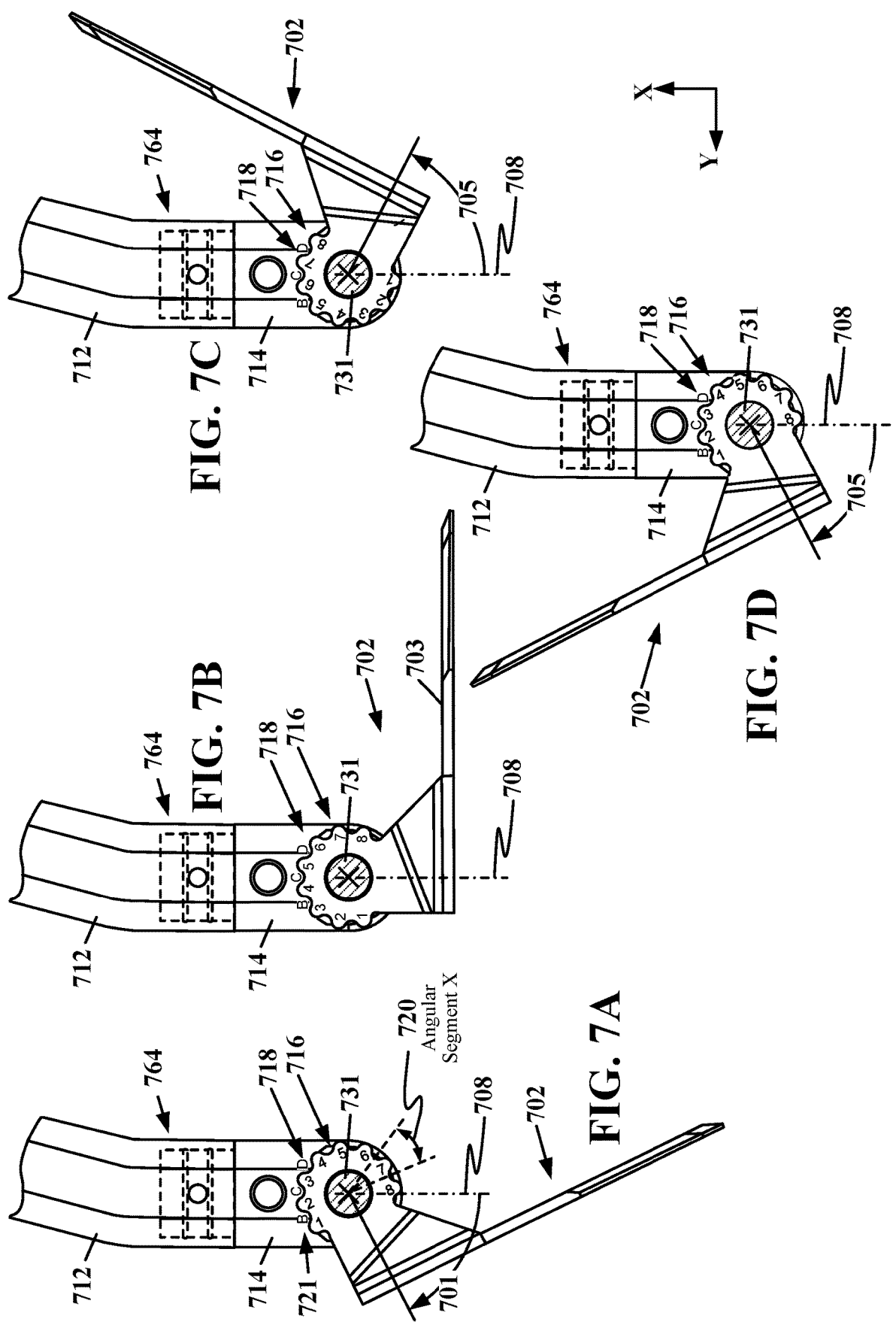

Garden Implement
with a First Fixed Orientation of
Toolhead Relative to Handle
Garden Implement Used as Third Class Lever Garden Implement
Rotated (Inverted) Axially
with the First Fixed Orientation of
Toolhead Relative to Handle Maintained
Garden Implement Used as First Class Lever

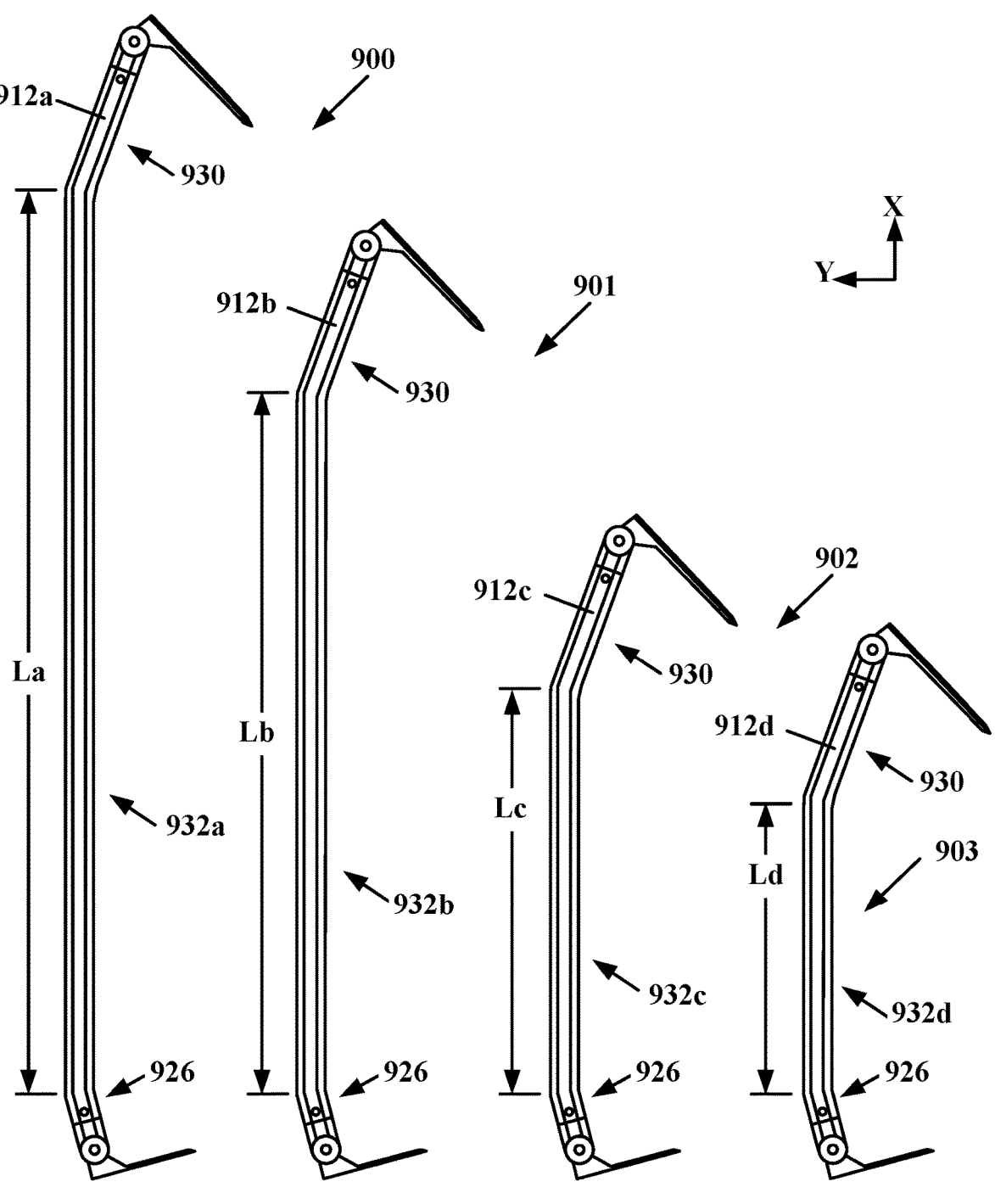
FIG. 9A      FIG. 9B      FIG. 9C      FIG. 9D

GARDEN IMPLEMENT

CROSS REFERENCE TO RELATED APPLICATIONS

This application for patent is a continuation of U.S. patent application Ser. No. 17/033,548 (now U.S. Pat. No. 11,700, 780) entitled "Garden Implement" filed in the United States Patent and Trademark Office on Sep. 25, 2020, the entire content of which is incorporated herein by reference as if fully set forth below in its entirety and for all applicable purposes.

BACKGROUND

Field

The present disclosure relates to the field of gardening. More specifically, the present disclosure relates to gardening implements that work soil.

Background

Plants, trees, and all non-animal life forms (individually or collectively referred to herein as vegetation) surround us. Some vegetation grows in the wild and other vegetation is cultivated, by way of example, for ornamental purposes, for boundary marking purposes, for food consumption purposes, or any combination thereof. Persons that cultivate vegetation for personal use and enjoyment are often called gardeners. Gardeners may plant, grow, and tend to vegetation such as trees, flowers, shrubs, vegetables, fruits, and herbs in plots of land adjacent to or near their homes, in communal settings, and/or in indoor settings such as green houses and/or in closed-in settings where artificial light is used. These plots of land may be small in size, for example when the plot consists of a border with decorative bushes and/or flowering plants surrounding a home or apartment building. These plots of land may be medium in size, for example when a plot includes a yard of a home and consists of one or more areas of ground within which trees, vegetables, and/or ornamental plants are grown. These plots of land may be large in size, for example when a plot is used to grow vegetables to feed one or a number of households. In general, these plots of land are referred to as gardens. In contrast, other plots of land may be called farms and the people that tend to them may be referred to as farmers. Gardeners and farmers have many of the same duties but perform those duties on different scales.

Additionally, other persons that do not necessarily refer to themselves as gardeners or farmers may also be responsible for planting and tending to vegetation. For example, trees, shrubbery, and plants may be used to demarcate borders of a property and/or add ornamentation to the grounds surrounding a home or business. Trees, shrubbery, and plants may also be found in and around open spaces where persons congregate to enjoy the outdoors. These non-garden-specific, non-farm-specific plots of land may be tended to by property owners that do not necessarily consider themselves to be gardeners or farmers or may be tended to by commercial entities hired to plant and/or maintain the vegetation in these sorts of plots of land. These types of people may be referred to by various names, such as groundskeeper.

Despite the different nature and sizes of the plots of land that gardeners, farmers, and groundskeepers tend to, they all make use of many of the same or similar tools to tend to their vegetation. These tools include, for example, a spade, a trowel, and a hoe. These and many other tools are referred to herein as garden tools.

Generally, garden tools are unitary in nature; that is, each garden tool is separate from another. A first garden tool (e.g., a spade with a fixed short handle) is distinct from a second garden tool (e.g., a hoe with a fixed long handle). Due in part to mass production, the orientation between a given working part of a garden tool and the handle of that garden tool is well established. However, consumers may find value in garden tools that are able to be customized to fit each respective consumer's own style of gardening.

SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A garden implement is disclosed. The garden implement includes a handle having spaced apart handle ends, at least one tool member having a pair of flanges extending therefrom, each flange including a flange bore defined by a flange internal sidewall and a pinion segment having a common first center with the flange bore, the pair of flanges having opposing parallel flange surfaces each including the pinion segment and having a pinion center axis intersecting the common first center and perpendicular to the opposing parallel flange surfaces, the opposing parallel flange surfaces spaced apart by a predetermined first distance, at least a first fixing member coupled between the pair of flanges and a respective handle end. In the garden implement, the first fixing member includes a first boss projecting along a longitudinal axis relative to the first fixing member, the first boss having parallel first boss surfaces spaced apart by the predetermined first distance, a first boss bore defined by a first boss internal sidewall, and a first boss bore center axis intersecting a first boss bore center and perpendicular to the parallel first boss surfaces, each respective first boss surface having a curved rack segment projecting perpendicularly therefrom and configured to mesh with at least a portion of the pinion segment. The garden implement also includes a fixing shaft insertably received in at least one flange bore and the first boss bore following coaxial alignment of the pinion center axis and the first boss bore center axis.

An interchangeable toolhead is disclosed. The interchangeable toolhead includes a tool member and a pair of flanges coupled to and extending from the tool member. Each flange includes a flange bore defined by a flange internal sidewall and a pinion segment having a common first center with the flange bore, the pair of flanges having opposing parallel flange surfaces including at least the respective pinion segment and a having a pinion axis intersecting the common first centers and perpendicular to the opposing parallel flange surfaces, the opposing parallel flange surfaces spaced apart by a predetermined first distance.

A plurality of articles of manufacture packaged as a garden implement set is disclosed. The garden implement set includes a handle having spaced apart handle ends, at least two toolheads each having a pair of flanges extending therefrom and including opposing parallel flange surfaces spaced apart by a predetermined first distance, at least two fixing members each fixed to respective handle ends and configured to couple the handle to a respective one of the at least toolheads, and at least two fixing shafts, each configured to be insertably received in a first fixing shaft receiver of a respective toolhead and a second fixing shaft receiver of a respective fixing member when the fixing shaft, first fixing shaft receiver, and second fixing shaft receiver are coaxially aligned.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying drawings. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein.

BRIEF DESCRIPTION OF THE DRAWINGS

Reference is made to the accompanying drawings in which are shown illustrative embodiments of a garden implement in accordance with some aspects of the disclosure. In the accompanying drawings, corresponding reference characters indicate corresponding parts.

FIG. 7A is a top plan view of a fixing member, a toolhead, and a portion a handle of a garden implement according to some aspects of the disclosure.

FIG. 7B is a top plan view of the fixing member and the toolhead of FIG. 7A, where the toolhead is in a "nominal" orientation.

FIG. 7C is a top plan view of the fixing member and the toolhead of FIG. 7B where the toolhead is rotated from the nominal orientation of FIG. 7B to a maximum angular displacement counterclockwise.

FIG. 7D is a top plan view of the fixing member and the toolhead of FIG. 7C, where the toolhead was removed from the fixing member, rotated about the longitudinal axis, and reinstalled to the fixing member according to some aspects of the disclosure.

FIG. 9A is a first garden implement having a first handle with a first center segment having a first center length according to some aspects of the disclosure.

FIG. 9B is a second garden implement having a second handle with a second center segment having a second center length according to some aspects of the disclosure.

FIG. 9C is a third garden implement having a third handle with a third center segment having a third center length according to some aspects of the disclosure.

FIG. 9D is a fourth garden implement having a fourth handle with a fourth center segment having a fourth length according to some aspects of the disclosure.

DETAILED DESCRIPTION

Figures 1A, 1B:
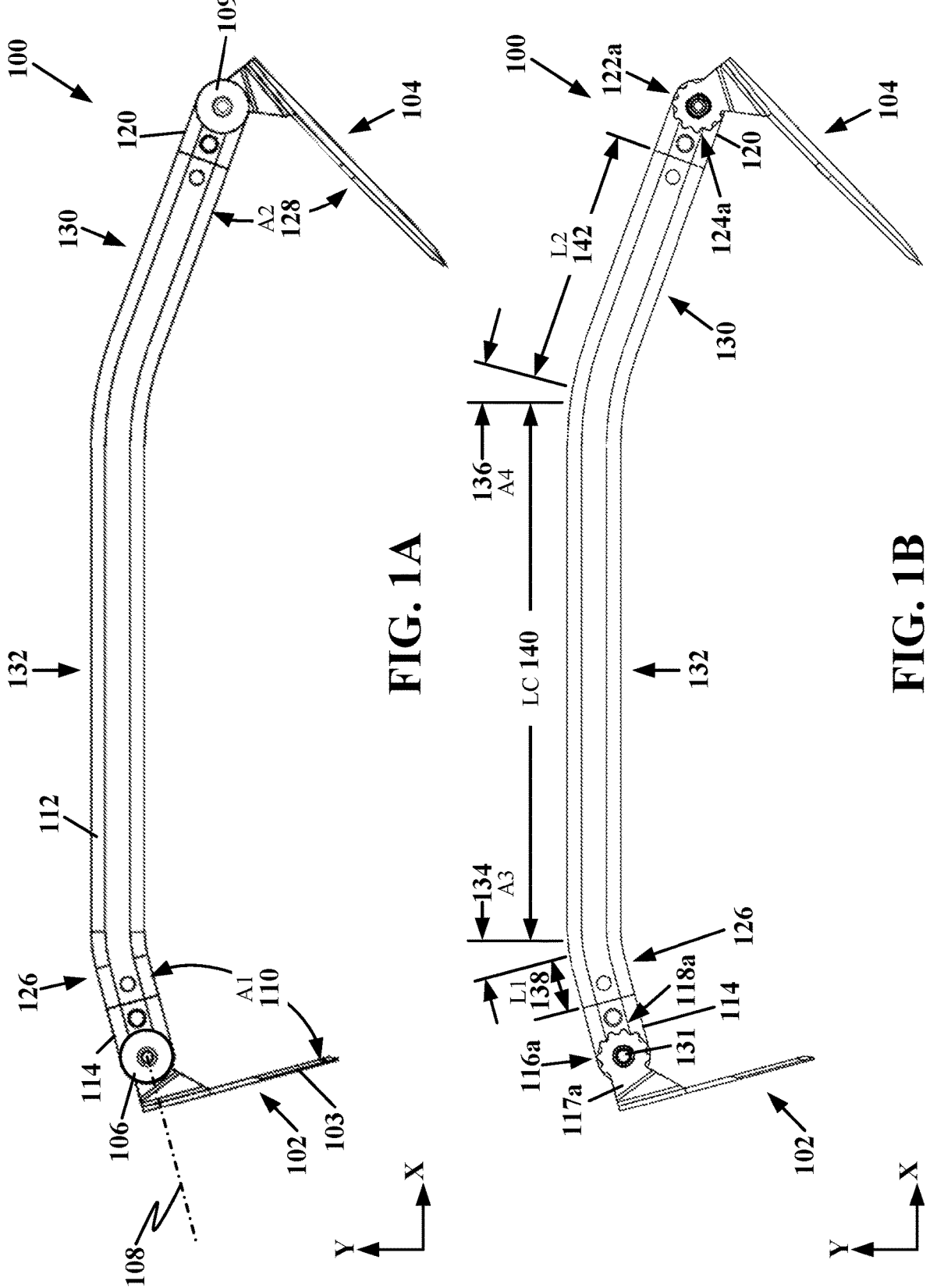
FIG. 1A is a top plan view of an ergo-dynamic dual-headed garden implement including two interchangeable tools heads that may be selected from a plurality of interchangeable toolheads according to some aspects of the disclosure.
FIG. 1B is the top plan view of the garden implement of FIG. 1A with a first fixing shaft cover and a second fixing shaft cover removed.

In the following description, specific details are given to provide a thorough understanding of the described implementations. However, it will be understood by one of ordinary skill in the art that the implementations may be practiced without these specific details. For example, in some instances, details of well-known structures and components may be shown in simplified form in order to avoid obscuring such structures and components. In other instances, well-known structures and components may be shown in detail in order not to obscure the implementations.

A garden implement having an ergonomically shaped handle is disclosed. As used herein the word "implement" may mean an object or a piece of equipment that may be used for a particular purpose. Fixing members may be coupled to either or both ends of the handle. In one non-limiting example, the gardening implement includes a handle having first and second ends. The handle may be divided into two or more segments. For example, the handle may be divided into three segments including a first segment, a center segment, and a second segment distal from the first segment and the center segment. The segments may be the same or different lengths. Angles of one segment relative to an adjacent segment may be the same or different. In one example, the handle including the first, center, and second segments, are continuously formed. In some examples, segments may be coupled to one another using an inter-segment angle fixing structure (e.g., a joint) that allows a user to changeably fix the angle between adjacent segments.

A fixing member may include a boss extending from the fixing member in a longitudinal direction relative to the fixing member. In some aspects, the fixing member is fixedly coupled to the handle, accordingly, the longitudinal direction may also be relative to the handle. The boss may be configured to couple to one of a plurality of interchangeable toolheads. In some examples, an interchangeable toolhead may include a tool member coupled to a pair of flanges. Tools may include, for example, a spade, a hoe, and a trowel. The preceding list is non-limiting: other tools are within the scope of the disclosure. In some examples, the tool member may be coupled one flange. According to some aspects, the symmetry of the fixing member relative to the handle, the boss relative to the handle, or both the fixing member and the boss relative to the handle may have at least one of right-left symmetry, top-bottom symmetry, or axial symmetry; however, symmetry is not limitation of the disclosure.

In examples in which the interchangeable toolhead may include a tool member coupled to a spaced apart pair of flanges, a width of the boss projecting from the fixing member may be substantially equal to a spacing between spaced apart parallel surface of flanges. In one example, the Toolhead includes the tool member and the pair of flanges. In another example, the tool head may include the pair of flanges configured as one object. Openings, apertures, or boreholes (referred to herein as "bores") may be provided through the flanges and the boss. Flange bores may be defined by internal sidewalls of the flange, while a boss bore may be defined by internal sidewalls of the boss. The bores in the flanges and boss may be configured to have coaxial alignment with one another when a fixing shaft fixes an interchangeable toolhead to a fixing member. The fixing shaft may restrict movement of the interchangeable toolhead by being received in at least one of the bores in the flanges and the bore in the boss. Angle fixing structures (e.g., an internal gear segment (e.g., a portion of an internal gear) configured to mesh with at least a portion of a pinion segment may be integrally formed with or in the boss and the flanges to lock the interchangeable toolhead at a predetermined angle relative to the fixing member (and therefore relative to the handle).

The boss may be configured to slide, in the direction of the longitudinal axis, between opposing surfaces of the parallel flanges until at least some of a plurality of first teeth on the flanges are meshed with at least some of a plurality of second teeth that may be formed in the boss. An angle of the interchangeable toolhead relative to the fixing member (and therefore relative to the handle) is selectable based on which of the plurality of first teeth of the flanges are meshed with the plurality of second teeth of the boss. The fixing shaft, when received in the bore of the boss and at least one of the bores of the flanges may fix the angle of the interchangeable toolhead relative to the fixing member (e.g., relative to the longitudinal axis). Changing the angle involves complete removal of the fixing shaft from the bore of the boss of from the bore of the boss and the bores of the flanges and disengagement of the plurality of first teeth of the flanges from the plurality of second teeth of the boss.

In general, the garden implement described herein may be a dual headed implement having different toolheads at distal ends of the garden implement. The toolheads may be adjustable to various angles using a durable sprocket-like coupling structure. The toolheads may be interchangeable and may be selected from a plurality of toolheads each implementing a different tool member (e.g., a different working part of a garden tool). The handle may be divided into segments having specific angles between adjacent segments. The angles may be the same or different. The angles enhance the usability of the garden implement. For example, the angles may provide a user with a greater mechanical advantage in comparison to a straight handle. Additionally, due the angles, the garden implement may be flipped over (e.g., rotated about a central axis of the handle of the garden implement) to provide a second functionality to the same toolhead previously utilized for a first functionality (e.g., a soil scraper first functionality and a shovel second functionality). Furthermore, the angles of the toolheads relative to the handle are changeable by a user. The plurality of available angles between a toolhead and the handle provide a plurality of ways the tool member of a toolhead may be used by a user of the garden implement.

FIG. 1A is a top plan view of an ergo-dynamic dual-headed garden implement 100 including two interchangeable toolheads (i.e., a first toolhead 102 and a second toolhead 104) that may be selected from a plurality of interchangeable toolheads according to some aspects of the disclosure. FIG. 1B is the top plan view of the garden implement 100 of FIG. 1A with a first fixing shaft cover 106 and a second fixing shaft cover 109 removed. The first fixing shaft cover 106 and second fixing shaft cover 109 may be integrally formed with a portion of an overall structure referred to herein as a fixing shaft; however, covers for the fixing shafts are optional. Additionally, the covers may be substituted for grasping structures having shapes adapted for grasping and rotating. These structures/shapes may include a tab and a wing-nut structure/shape that may be formed integrally with the fixing shaft or may be a component part of an assembly configured to perform the function of the fixing shaft. FIG. 1A and FIG. 1B may be collectively referred to as FIG. 1 herein.

In the example of FIG. 1, the first toolhead 102 is depicted as a hoe or a hoe-like tool member and the second toolhead 104 is depicted as a forked weeder or forked cultivator. The toolheads represented in FIG. 1 are interchangeable toolheads and are provided as non-limiting examples.

A first angle 110 (denoted as A1) of the first toolhead 102 relative to a handle 112 (or, as-illustrated in the exemplary figure, relative to a first segment 126 of the handle 112) may be selected by a user. In the example of FIG. 1, a first tool member 103 of the first toolhead 102 is perpendicular to the longitudinal axis 108 projecting from a first fixing member 114. This orientation may be referred to as a nominal orientation. The first toolhead 102 may be reoriented clockwise or counterclockwise relative to the nominal orientation. Reorientation requires removal of a fixing shaft 131 from at least one flange and from an opening in the first fixing member 114. The openings are referred to as "bores" (e.g., bore holes) herein. The openings in the flanges are referred to as "flange bores" and the opening in the fixing member 114 is referred to as a "boss bore" because the opening in located through a portion of the fixing member 114 which is referred to as a "boss" herein. Reorientation requires removal of the fixing shaft 131 from the boss bore and at least one flange bore. Reorientation also requires the disengagement of a first locking feature (also referred to as a segment of a pinion gear or a pinion segment 116a herein) from the second locking feature (also referred to as a segment of an internal gear, an internal gear segment, a ring gear, ring gear segment, or a curved rack segment 118a herein). Additional details about the flange bores, boss bore, first locking feature and second locking feature are provided throughout the disclosure.

Figure 5:
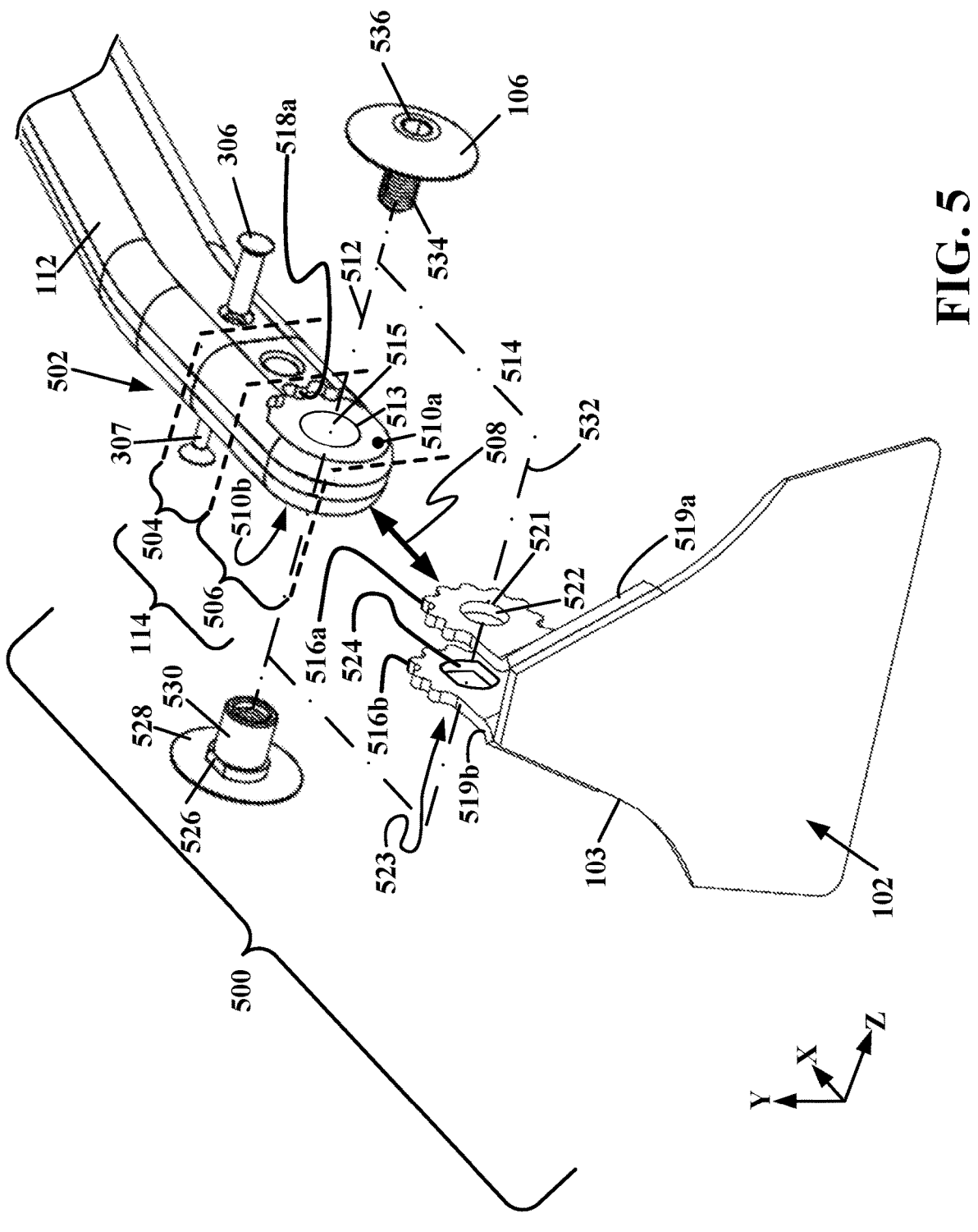
FIG. 5 is an exploded perspective view of a portion of the garden implement as depicted in FIG. 3 according to some aspects of the disclosure.

Reorientation established the first angle 110 depicted in FIG. 1. The first angle 110 may be fixed by insertion (e.g., engagement) of the fixing shaft 131 into at least one flange bore and into the boss bore. To change the first angle 110 of the first toolhead 102, for example, the user may proceed through several steps. In the example of FIG. 1, the user may remove a first fixing shaft cover 106 (which in the example of FIG. 1 is formed integrally with a fixing shaft male threaded member 534 of FIG. 5) from the first fixing member 114 and a first flange 117*a* of the first toolhead 102. The user may also remove a second fixing shaft cover (on the far side of the first fixing shaft cover 106) from the first fixing member 114 and a second flange (see, e.g., second flange 519*b* of FIG. 5). The second fixing shaft cover is not shown in FIG. 1. An example of a second fixing shaft cover may be the second fixing shaft cover 528 of FIG. 5. In the example of FIG. 5, a fixing shaft sleeve 530 with internal female threads and/or the fixing shaft male threaded member 534 of FIG. 5 may be collectively referred to as a fixing shaft. In general, however, to change the first angle 110, the user may remove the fixing shaft 131 from the at least one flange bore and the boss bore.

As used herein a reference to a fixing shaft, such as fixing shaft 131 of FIG. 1A and fixing shaft 631 of FIG. 6, is a reference to an object that is configured to be received within at least one flange bore and within the boss bore when axial centers of the at least one flange bore, the boss bore, and the fixing shaft may be coaxially aligned. Insertion of the fixing shaft 131 under these conditions fixes the relative positions of the flanges of the toolhead (e.g., first toolhead 102) with respect to the fixing member (e.g., first fixing member 114, or more particularly the boss of the first fixing member 114). Fixing the relative positions of the flanges of the toolhead with respect to the fixing member prevents translation of the fixing member relative to the at least one flange, or more particularly prevents longitudinal translation of the fixing member relative to the at least one flange in a direction of a longitudinal axis 108 of the first fixing member 114. According to some aspects, the fixing shaft 131 may be cylindrical but other shapes are within the scope of the disclosure. The fixing shaft 131 may be smooth, have external threads, internal threads, or any combination thereof along some or all of the fixing shaft 131. As used herein, with respect to an x-y-z coordinate system, translation means linear movement in the x-y plane, the y-z plane, or the x-z plane. Translation is distinct from rotation about the x-axis, y-axis, or z-axis.

To change the first angle 110, following withdrawal of the fixing shaft 131, the user may withdraw the pinion segment 116*a* of the first toolhead 102 from engagement with a curved rack segment 118*a* of the first fixing member 114. Withdrawal may be along the longitudinal axis 108. After slidingly withdrawing the pinion segment 116*a* from the curved rack segment 118*a*, a user may rotatably reorient the first toolhead 102 to any of a predetermined and fixed number of angular orientations. The user may then slidingly insert (e.g., slidingly engage) the pinion segment 116*a* into conjugate corresponding features of the curved rack segment 118*a* (e.g., until at least a portion of the pinion segment 116*a* meshes with at least a portion of (or the entire portion of) the curved rack segment 118*a* and the flange bore axis is coaxially aligned with the boss bore axis. As used herein, the term "mesh" may mean an engagement of teeth of one gear (e.g., a pinion segment) to a whole depth of a space between teeth of another gear (e.g., a curved rack segment). The user may then insert the fixing shaft 131 into at least the first flange 538*a* and the boss to secure the first toolhead 102 from motion relative to the boss. In the example of FIG. 1, the pinion segment 116*a* is a segment of a pinion gear with a plurality of first teeth having a first angular pitch (e.g., angular spacing between crests of adjacent teeth or between valleys between adjacent teeth) and the curved rack segment 118*a* is a segment of a curved rack gear with a plurality of second teeth having the first angular pitch. In the exemplary illustrations, the first teeth and the second teeth are sinusoidally shaped and configured for maximum surface area contact. Other tooth shapes, such as, for example, involute, cycloidal, and trochoidal, as well as other locking feature structures are within the scope of the disclosure.

Returning to FIG. 1A, a second angle 128 (denoted as A2) of the second toolhead 104 relative to the handle 112 (or, as-illustrated in the exemplary figure, relative to a second segment 130 of the handle 112) may be selected by a user. The process for rotatably reorienting and fixing the second toolhead 104 to the second fixing member 120 may be the same or substantially similar to that just described with reference to the first toolhead 102 and first fixing member 114. The third locking feature 122*a* of the second toolhead 104 and the fourth locking feature 124*a* of the second fixing member 120 may be the same or substantially similar to those just described with reference to the pinion segment 116*a* of the first toolhead 102 and the curved rack segment 118*a* of the first fixing member 114. Accordingly, the processes and features will not be repeated for the sake of brevity. In general, the processes and features will be described in greater detail below.

By way of example, either or both of the first fixing member 114 and the second fixing member 120 may be formed of metal and formed by hot forging, formed of metal and formed by cold-forging, formed of metal and formed by pouring the metal in a liquid state into a casting, formed of plastic and formed by injection molding of the plastic, and/or formed of fiberglass and formed by wrapping fiberglass around a mold and impregnating the fiberglass with a resin. The preceding list is illustrative and non-limiting.

The first angle 110 may be the same or different from the second angle 128. The angles depicted in FIG. 1 are provided for illustration and are not limiting.

The handle 112 of the garden implement 100 may be formed of one piece of stock or a plurality of pieces of stock (e.g., the stock may be hollow tubing). In the example of FIG. 1, the handle 112 of the garden implement 100 may be a hollow rectangular length of tubing. According to one example, the tubing may be aircraft grade aluminum. It is noted that the preceding example is non-limiting. For example, solid materials and hollow materials of any cross-sectional shape are within the scope of the disclosure. Additionally, it is noted that other stock (including, for example, metals, fiberglass, and plastic) are within the scope of the disclosure.

Figure 2:
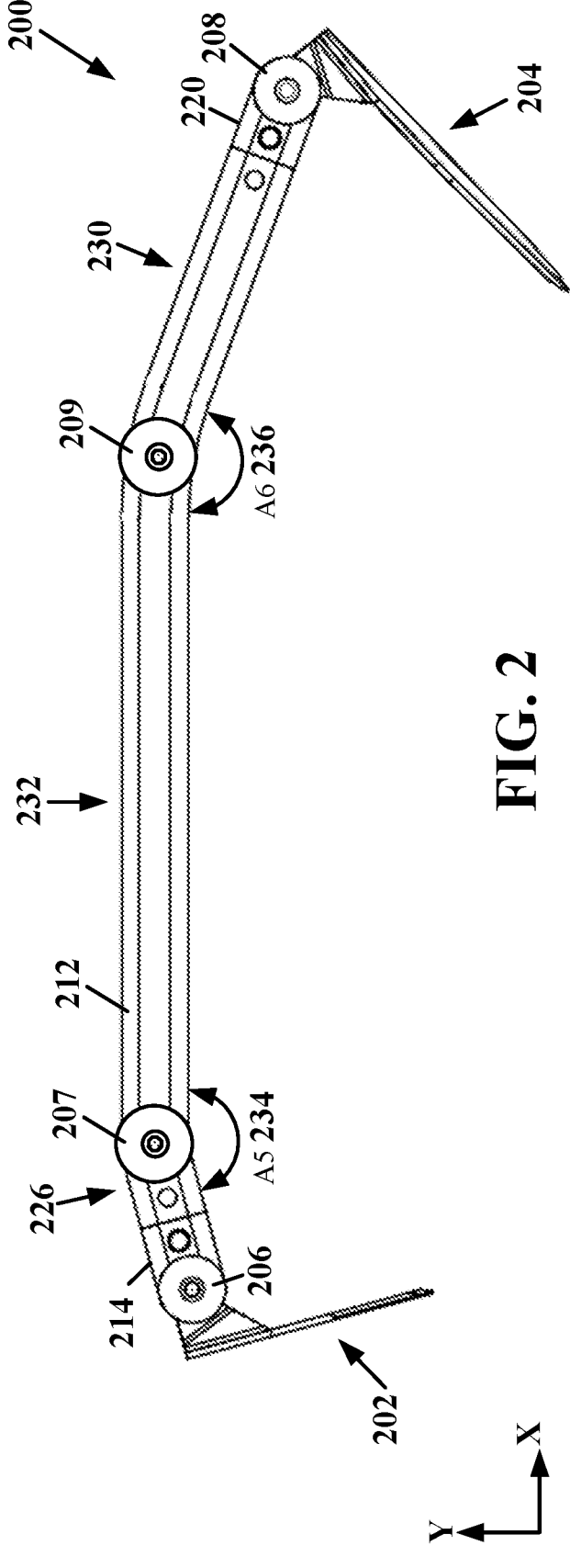
FIG. 2 is a top plan view of another ergo-dynamic dual-headed garden implement including two interchangeable toolheads that may be selected from a plurality of interchangeable toolheads according to some aspects of the disclosure.

The handle 112 may be straight or curved or take any shape. The handle 112 may be described as including a plurality of segments. In the illustrated example of FIG. 1, the handle 112 may be formed from three segments; namely first segment 126, second segment 130, and center segment 132. According to some aspects, the plurality of segments may be continuous with each other, as in the example of FIG. 1. According to other aspects, the plurality of segments may be contiguous with each other and coupled to each other by joints between adjacent segments (e.g., as illustrated in FIG. 2). In some examples, the handle may include one, two, three, or more segments.

In the exemplary illustration of FIG. 1B, there may be a fixed third angle 134 (denoted as A3), between the first segment 126 and the center segment 132. By way of example only, the fixed third angle 134 may be any angle in a range of about 10 to 30 degrees, or more particularly within a range of about 15 to 25 degrees, or more particularly may be about 20 degrees. In the exemplary illustration of FIG. 1B, there may be a fixed fourth angle 136 (denoted as A4) between the center segment 132 and the second segment 130. By way of example only, the fixed fourth angle 136 may be any angle in a range of about 10 to 30 degrees, or more particularly within a range of about 15 to 25 degrees, or more particularly may be about 20 degree. In the example of FIG. 1, the fixed third angle 134 and the fixed fourth angle 136 may be the same; however, having the fixed third angle 134 different from the fixed fourth angle 136 is within the scope of the disclosure.

According to some aspects, the fixed third angle 134 and the fixed fourth angle 136 may be chosen such the ends of the segments coupled to the first fixing member 114 and the second fixing member 120, respectively, tip toward one another, toward one side of the center segment 132 as depicted in FIG. 1. According to other aspects, the fixed third angle 134 and the fixed fourth angle 136 may be chosen such the ends of the segments coupled to the first fixing member 114 and the second fixing member 120, respectively, tip away from one another. According to still other aspects, a value of at least one of the fixed third angle 134 or the fixed fourth angle 136 may be zero; accordingly, in such an aspect, although the handle may be described as having three segments, only one pair of segments would share a non-zero angle therebetween. The preceding examples are illustrative and are non-limiting.

In the exemplary illustration of FIG. 1, the first segment 126 may have a first fixed length 138 (denoted as L1), the center segment 132 may have a fixed center length 140 (denoted as LC), the second segment 130 may have a fixed second length 142 (denoted as L2). The three lengths may be the same, or two lengths may be the same while a remaining length is different, or the three lengths may be different. In the exemplary illustration of FIG. 1, L1<L2<LC. These differences are exemplary and non-limiting. Other relativistic arrangements of the lengths of the first segment 126, the second segment 130, and the center segment 132 are within the scope of the disclosure.

As explained above, FIG. 1B depicts the garden implement 100 of FIG. 1A with the first fixing shaft cover 106 and the second fixing shaft cover 109 removed. With the first fixing shaft cover 106 removed, the pinion segment 116a associated with the first toolhead 102 and curved rack segment 118a of the first fixing member 114 are visible. Similarly, with the second fixing shaft cover 109 removed, the third locking feature 122a associated with the second toolhead 104 and the fourth locking feature 124a of the second fixing member 120 are visible. The various locking features and their interaction will be described in greater detail below. While the locking features of FIG. 1B (e.g., the pinion segment 116a and the third locking feature 122a, and the corresponding curved rack segment 118a and the fourth locking feature 124a, respectively) are illustrated as being the same, use of different locking features is within the scope of the disclosure. For example, one pair of locking features may offer a greater number of predetermined fixed angular orientations than a second pair of locking features, or one pair of locking features may offer a greater resistance to angular changes or may be rated to withstand a higher torque than a second pair of locking features.

FIG. 2 is a top plan view of another ergo-dynamic dual-headed garden implement 200 including two interchangeable toolheads (i.e., a first toolhead 202 and a second toolhead 204) that may be selected from a plurality of interchangeable toolheads according to some aspects of the disclosure. FIG. 2 is similar to FIG. 1 in all respects with the exception of an addition of a first inter-segment angle fixing feature 207 (e.g., a first joint) and a second inter-segment angle fixing feature 209 (e.g., a second joint). Similar to the example of FIG. 1, the handle 212 of the garden implement 200 may include a first segment 226, a second segment 230, and a center segment 232. In the example of FIG. 2, adjacent segments may be coupled to each other by the inter-segment angle fixing features, or joints. The first inter-segment angle fixing feature 207 may be similar in construction and operation to the first the pair of the pinion segment 116a and curved rack segment 118a of FIG. 1B (or the pair of the third locking feature 122a and fourth locking feature 124a of FIG. 1B). The second inter-segment angle fixing feature 209 may be similar in construction and operation to the first the pair of the pinion segment 116a and curved rack segment 118a of FIG. 1B (or the pair of the third locking feature 122a and fourth locking feature 124a of FIG. 1B). Descriptions of these features and related operations will not be repeated for the sake of brevity.

As depicted, the first inter-segment angle fixing feature 207 may be configured to permit a user to repeatably and selectively fix a fifth angle 234 (denoted as A5) between the first segment 226 and the center segment 232. The fifth angle 234 may be selectable among a predetermined number of fixed angles. The fifth angle 234 may range, for example, between about plus and minus 90 degrees, or more particularly between about plus and minus 60 degrees relative to an axis of the center segment 232 of the garden implement 200 handle 212. Likewise, the second inter-segment angle fixing feature 209 may be configured to permit a user to repeatably and selectively fix a sixth angle 236 (denoted as A6) between the center segment 232 and the second segment 230. The sixth angle 236 may be selectable among a predetermined number of fixed angles. The sixth angle 236 may range, for example, between about plus and minus 90 degrees, or more particularly between about plus and minus 60 degrees relative to an axis of the center segment 232 of the garden implement 200 handle 212. The predetermined number of fixed angles attributed to the first inter-segment angle fixing feature 207 and the second inter-segment angle fixing feature 209 may be the same or different. The step sizes between the fixed angles may also be the same or different. The configurations of the first inter-segment angle fixing feature 207 and the second inter-segment angle fixing feature 209 may be the same or different.

Figure 3:
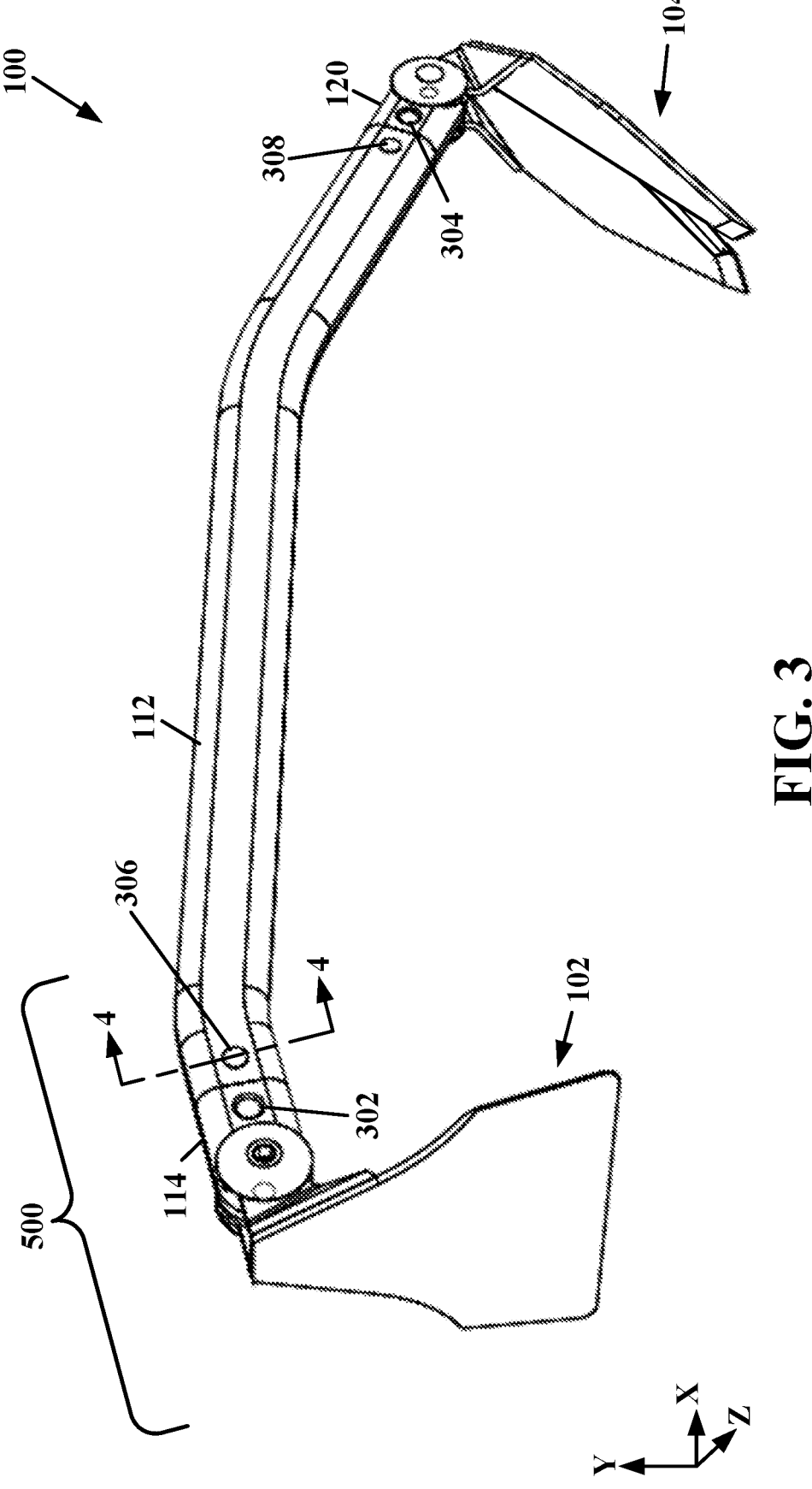
FIG. 3 is a perspective view of the garden implement of FIGS. 1A and 1B.

FIG. 3 is a perspective view of the garden implement 100 of FIGS. 1A and 1B. Descriptions of components of FIG. 1 that were described in connection with FIG. 1 (e.g., the handle 112, the first fixing member 114, the second fixing member 120, the first toolhead 102, and the second toolhead 104) will not be repeated for the sake of brevity.

In FIG. 3, a first lanyard bore 302 (e.g., a through hole formed in the first fixing member 114 and defined by internal sidewalls of the first fixing member 114) is identified. Similarly, a second lanyard bore 304 (e.g., a through hole formed in the second fixing member 120 and defined by internal sidewalls of the second fixing member 120) is identified. The first lanyard bore 302 and/or the second lanyard bore 304 may be used to secure one or more lanyards (not shown) (e.g., a rope that may be formed with a loop and passed around the neck, shoulder, or wrist for holding the garden implement 100) to the garden implement. The one or more lanyards may be used, for example, to add stability to the garden implement 100 as a user employs the garden implement 100. The one or more lanyards may be used, for example, to secure the garden implement 100 to keep it from falling to the ground or to temporarily fix the garden implement 100 to an object, such as a chair, stool, wall, or work bench, for example.

A first rivet 306 and a second rivet 308 are also identified in FIG. 3. According to some aspects, the first fixing member 114 may be insertably fixed to the handle 112 of the garden implement 100 through use of at least the first rivet 306. Likewise, the second fixing member 120 may be insertably fixed to the handle 112 of the garden implement through use of at least the second rivet 308. In some aspects, the first rivet 306 and/or the second rivet 308 may be installed and their heads ground or sanded down to be flush with the surfaces of the handle 112 of the garden implement 100. According to some examples, a rivet such as those used to couple handles to kitchen or restaurant knives may be used. Such rivets may be referred to as cutlery rivets. Of course, any fastening structure that is able to fix the first fixing member 114 and the second fixing member 120 to the handle 112 of the garden implement 100 is within the scope of the disclosure. For example, rivets, screws, bolts, and/or dowels (alone or in combination with other components such as nuts and threaded holes) may be used to fix the first fixing member 114 and second fixing member 120 to the handle 112 of the garden implement 100.

According to some aspects, the first fixing member 114 and the second fixing member 120 may be permanently fixed to the handle 112 of the garden implement 100. An adhesive (not shown) may be applied to portions of the first fixing member 114 and second fixing member 120 that are inserted into a hollow core of the handle 112 of the garden implement 100. According to still other aspects, a fit between some or all of the surfaces of the first fixing member 114 and second fixing member 120 that are inserted into the hollow core of the handle 112 of the garden implement 100 may be configured with close tolerances such that a "force fit" (also known as or similar to a "friction fit" or an "interference fit") of the first fixing member 114 and second fixing member 120 into the hollow core of the garden implement 100 handle 112 is achieved. With reference to FIG. 6, a first rib 660 and/or second rib 662 of FIG. 6) may surround a second boss 664. The second boss 664 may project from the body segment 604 of a fixing member 614 in a direction different from the first boss 606 and may be configured to couple to a respective end of a handle 112 of the garden implement 100. The first rib 660 and/or the second rib 662 may have outer dimensions that facilitate the force fit between the inner surfaces of the handle 112 (which may be hollow) of the garden implement 100. The space above, below, and/or between either or both of the first rib 660 and/or the second rib 662 may be used to receive an adhesive, for example. According to some aspects, any one or any combination of one or more rivets, adhesive, and force fit may be used to fix each fixing member (e.g., first fixing member 114, second fixing member 120) to the handle 112 of the garden implement 100. A cross-section taken along the lines 4-4 in FIG. 3 is provided in FIG. 4. An exploded view of a portion 500 of FIG. 3 is provided in FIG. 5. While the second boss 664 is depicted as being configured to couple to the respective end of the handle 112 by fitting within the hollow core of the handle 112, the disclosure is not limited to this form of coupling. In one example, the second boss 664 could be configured to fit over the respective end of the handle, like a sleeve. In another example, the second boss 664 may be configured with threads to screw into or onto the respective end of the handle. The preceding examples are illustrative and non-limiting.

Figure 4:
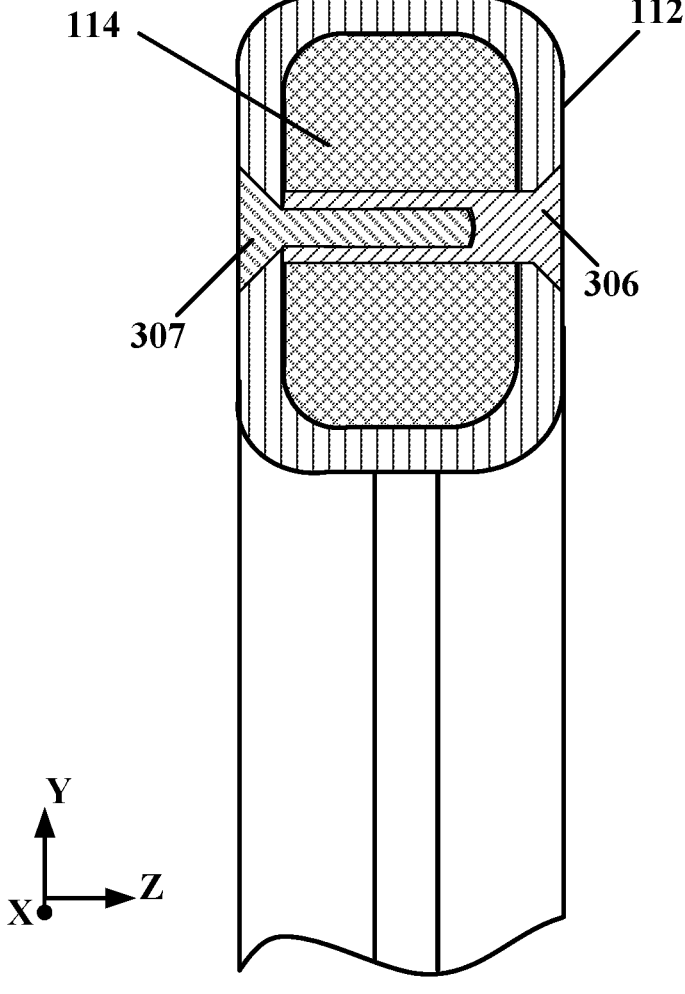
FIG. 4 is a cross-section along the lines 4-4 of FIG. 3, of the garden implement of FIGS. 1A and 1B according to some aspects of the disclosure.

FIG. 4 is a cross-section along the lines 4-4 of FIG. 3 of the garden implement 100 of FIGS. 1A and 1B according to some aspects of the disclosure. Depicted is a rectangular hollow tube such as the handle 112 of the garden implement 100. Of course, this configuration depicted in FIG. 4 is one non-limiting example. Other cross-sections are within the scope of the disclosure. A portion of the first fixing member 114 is depicted as filing the hollow cross-section of the handle 112. According to some aspects, dimensional tolerances of the portion of the first fixing member 114 that enters the hollow space of the handle 112, and/or one or more ribs (e.g., first rib 660 and second rib 662 of FIG. 6C) that enter the hollow space of the handle 112 may have close tolerance to ensure a force fit therebetween. According to other aspects, the material of the first fixing member 114 may be relatively more malleable than the material of the handle 112; the portion of the first fixing member 114 that is inserted into the handle 112 may be caused to deform and/or to flow, thus fixing the portion of the first fixing member to the handle 112. The first rivet 306 and a rivet sleeve 307 (previously hidden from view) are depicted in FIG. 4. The heads of the first rivet 306 and the rivet sleeve 307 are depicted in a flush-to-surface configuration. The illustrated configuration may be achieved, for example, by sanding and/or grinding down any portion of a head (or other protruding part) of the first rivet 306 and/or the rivet sleeve 307 that protrudes from the outer surface of the handle 112.

FIG. 5 is an exploded perspective view of a portion 500 of the garden implement 100 as depicted in FIG. 3 according to some aspects of the disclosure. Depicted are the first fixing member 114 coupled to a first handle end 502 (where, for example, the first handle end 502 may be a respective handle end of a pair of distal handle ends) of the handle 112 of the garden implement 100. Second flange 519*b*, which is hidden in FIG. 1, FIG. 2, and FIG. 4 is visible. Although the first rivet 306 and the rivet sleeve 307 are used in connection with the illustrated portion of the garden implement 100, any fastening structure, such as a rivet, screw, bolt, or dowel (with or without adhesive), for example, is within the scope of the disclosure.

The first fixing member 114, coupled to the first handle end 502, may include (e.g., may comprise, may be formed of) a body segment 504 and a first boss 506. A second boss (e.g., 664 of FIG. 6) may be received within a hollow space within the handle 112 of the garden implement 100, for example. The second boss is not depicted in the illustration of FIG. 5 to avoid cluttering the drawing. According to some aspects, the body segment 504 may have a finite non-zero length and the body segment 504 may be juxtaposed to the first handle end 502 of the handle 112, or the body segment 504 may have a zero length and the first boss 506 may project from the second boss at the first handle end 502. The first boss 506, body segment 504, and the second boss (not shown) may be formed as one integral part.

According to some aspects, the first boss 506 may project from the body segment 504, and away from the first handle end 502, along a longitudinal axis 508 (where, the longitudinal axis 508 is represented by a double headed arrow). The first boss 506 may include at least a portion having a first boss width (645 of FIG. 6) that is less than a body segment width (647 of FIG. 6) proximal to the first boss 606. The spaced apart parallel boss surfaces 510*a*, 510*b* may be spaced apart by the first boss width (645 of FIG. 6) The first boss width (645 of FIG. 6) may correspond to the predetermined first distance (644 of FIG. 6) between opposing parallel surfaces of the first flange 519*a* and the second flange 519*b*. The corresponding dimensions may be selected to facilitate the sliding of the first boss 506 between the opposing parallel surfaces of the first flange 519*a* and the second flange 519*b*, within tolerance limits of manufacture. The first boss 506 may further include a boss bore 513 defined by an internal sidewall 515 of the first boss 506. The boss bore 513 may have a boss bore center axis 512 (depicted a long-dash dot line) perpendicular to the spaced apart parallel boss surfaces 510*a*, 510*b* and also perpendicular to the longitudinal axis 508.

The first fixing member 114 (or the first boss 506 of the first fixing member 114) may further include a pair of spaced apart second locking features including curved rack segment 118*a* projecting from the spaced apart parallel boss surfaces 510*a*, 510*b* (where 510*b* is not visible in FIG. 5) and another second locking feature projecting from an opposite side of the first boss 506. In one example, the pair of spaced apart curved rack segments (e.g., curved rack segment 118*a* and curved rack segment 118*b*) may be a pair of spaced apart curved walls that may project perpendicularly outward or away from the respective spaced apart parallel boss surfaces 510*a*, 510*b*. Each of the spaced apart curved walls may form curved rack segments (e.g., curved rack segment 118*a* and curved rack segment 118*b*) that may span between spaced apart edges (e.g., spaced apart edges 656 of FIG. 6) of the first boss 506. Each of the pair of spaced apart curved rack segments 118*a*, 118*b* may be configured, for example, as a segment of an internal gear (also referred to as an internal ring gear or a ring gear) having a plurality of second teeth with a given angular pitch.

According to some aspects, the curved rack segments 118*a*, 118*b* may each be a curved rack gear segment, also referred to herein as a curved rack segment (e.g., curved rack segment 618*a*, 618*b* of FIG. 6). The angular pitch may be the angular distance between crests of adjacent teeth or between roots of adjacent teeth. As used herein a segment may be a non-360 degree arc length of a circle, or a portion of a circular of non-circular curve. According to some aspects, the angular pitch may not evenly divide into 360 degrees. For example, according to one aspect, the angular pitch may be 31.04 degrees. An angular pitch that is not evenly able to divide into 360 degrees may facilitate the inclusion of a greatest amount of surface area for complete or partial spaces between adjacent crowns of teeth and thereby increases a total surface area against which engaged teeth of a pinion segment may exert force. By way of one example, the angular pitch of 31.04 degrees provides for three complete teeth and the spaces therebetween plus two partial spaces on either side of the three complete teeth. The angular pitch of 31.04 degrees provides for 5 positions about which a toolhead may be oriented. In this example, a total range of orientations of 124.16 degrees. Some toolheads may have more or less adjustment positions (e.g., 6 or 4 positions). For a given torque applied to the toolhead, the greater the number of teeth the more susceptible is the chance of striping teeth from the pinion segment 116*a*, the curved rack segment 118*a*, or both. Additional factors that relate to durability include the material used to manufacture the pinion segment 116*a* and the curved rack segment 118*a*, the whole depth of the spaces between adjacent teeth of the curved rack segment 118*a* and the height of adjacent teeth of the pinion segment 116*a*, as well as the thickness of the pinion segment 116*a* in comparison to the height of the curved rack segment 118*a*.

FIG. 5 also depicts the first toolhead 102. According to some aspects, the first toolhead 102 may include a pair of flanges (e.g., a first flange 519*a* and a second flange 519*b*) and a tool member 103. As used herein, the tool member 103 coupled to the first flange 519*a* and the second flange 519*b* may be collectively referred to as an interchangeable toolhead herein (e.g., interchangeable toolhead 602 of FIG. 6). Interchangeable toolheads may embody respective tools. For example, a cultivator of interchangeable toolhead 1002 of FIG. 10A, a push-pull rake of interchangeable toolhead 1004 of FIG. 10B, a spade of interchangeable toolhead 1006 of FIG. 10C.

In the example of FIG. 5, the first flange 519*a* includes a segment of a first pinion gear, referred to herein as a first pinion segment 516*a* (similar to the pinion segment 116*a* of FIG. 1). The term pinion gear is used herein to refer to a gear having outwardly radiating teeth, or a portion of a circular or non-circular toothed curve having outwardly radiating teeth, that mesh with an internal gear having inwardly radiating teeth, or a portion of a circular or non-circular toothed curve having inwardly radiating teeth. The first pinion segment 516*a* may have a plurality of first teeth with the given angular pitch (i.e., the same or complementary pitch as those of the plurality of second teeth of a first curved rack segment 518*a* (similar to the curved rack segment 118*a* of FIG. 1). Again, as used herein a segment may be a non-360 degree arc length of a circle, or a portion of a circular or non-circular curve. The first pinion segment 516*a* may also include a first flange bore 521 defined by an internal sidewall 522 of the first flange 519*a*.

The first and second fixing structures may be, for example, a pinion segment and an internal gear segment configured to mesh with the pinion segment, respectively. The structures of the first and second fixing structures may be interchanged. The pluralities of teeth of these segments may be integrally formed with or in the flanges and the first boss and may be used to lock the interchangeable toolhead at a predetermined angle relative to the longitudinal axis 508 of the first boss 506 of the first fixing member 114 (and therefore relative to the handle 112 of the garden implement).

The internal gear segment also referred to herein as first curved rack segment 518*a*, may be concave semi-circular and may have a center coincident with a center of the boss bore center axis 512 of the boss bore 513. In one aspect, the internal gear segment (e.g., a portion of an annular gear or a ring gear) may have minor arc (less than 180 degrees) that spans between outer edges of the first boss 506. The plurality of second teeth of the internal gear segment may have crests that radiate toward the boss bore center axis 512 of the boss bore 513. The plurality of second teeth may have roots between the crests. Adjacent pairs of crowns and roots form adjacent spaces between teeth that are arranged in a semi-circle, along the minor arc between the ends of the first boss 506. In one example, the spaces between teeth (measured between crowns of teeth) may have a maximum height (measured along the z-axis of FIG. 5) at a midpoint point equidistant from the ends of the minor arc and a minimum height at both edges of the minor arc. The minimum height may be achieved by gradually reducing the height of one or more tooth crests at both ends of the minor arc. In another example, the height (e.g. a dimension measured perpendicularly to that boss surface along the z-axis in FIG. 5) of the plurality of second teeth may have a maximum at a midpoint point equidistant from the ends of the minor arc and may have minimum heights at both edges of the minor arc. The minimum tooth height may be achieved by a stepwise reduction in height of one or more tooth crests at both ends of the minor arc.

FIG. 5 also depicts a second flange 519b that includes a segment of a second pinion gear, referred to herein as the second pinion segment 516b. The second pinion segment 516b may include the first locking feature 116b formed as a plurality of first teeth of the second pinion segment 516b with the given angular pitch (i.e., the same or complementary pitch as those of the plurality of second teeth of the second locking feature (not shown) on the hidden side of the first boss 506 of FIG. 5). The second pinion segment 516b may also include a second flange bore 523 defined by an internal sidewall 524 of the second flange 519b. The center axis of the second flange bore 523 and the previously described pinion center axis 532 may be collectively referred to as the pinion center axis 532.

In the example of FIG. 5, the internal sidewall 522 defines a right circular cylinder, however any shape lies within the scope of the disclosure. The internal sidewall 524 defines a carriage-bolt style opening having a shape of a circle with two parallel segments of the circle truncated, however any shape lies within the scope of the disclosure. The internal sidewall 524 may receive a correspondingly shaped carriage bolt feature 526 of the second fixing shaft cover 528. The carriage bolt feature 526 of the second fixing shaft cover 528, when received in the second flange bore 523 serves to keep the fixing shaft sleeve 530 with internal female threads from rotating as the fixing shaft male threaded member 534 is rotated to tighten or loosen the fixing shaft male threaded member 534 in the fixing shaft sleeve 530 with internal female threads. The first fixing shaft cover 106 and the second fixing shaft cover 528 with their integral components are only one example of a fixing shaft as described herein. Additional examples include a carriage bolt and a nut or a wing nut, both without cover features.

In the example of FIG. 5, each of the first pinion segment 516a and the second pinion segment 516b of the first flange 519a and the second flange 519b, respectively, may be included in opposing parallel flange surfaces (e.g., opposing parallel flange surfaces 625a, 625b of FIG. 6). In some examples, the respective opposing parallel flange surfaces (e.g., 625a, 625b of FIG. 6) may be in slidable contact with corresponding respective spaced apart parallel boss surfaces 510a, 510b. Tolerances of manufacturing may provide for spaces between the opposing surfaces.

The pinion center axis 532, which may be perpendicular to the opposing parallel flange surfaces (e.g., 625a, 625b of FIG. 6) and perpendicular to the spaced apart parallel boss surfaces 510a, 510b may be configured to coaxially align with the boss bore center axis 512 of the first fixing member 114 after the opposing parallel flange surfaces (e.g., 625a, 625b of FIG. 6) slide parallel to and along the longitudinal axis 508 and between the spaced apart parallel boss surfaces 510a, 510b to where at least a portion of the plurality of first teeth of pinion segments mesh with at least a portion of the plurality of second teeth of the internal gear segments proximal to the body segment 504 of the first fixing member 114.

Once the boss bore center axis 512 and the pinion center axis 532 are in coaxial alignment, the fixing shaft, represented in the example FIG. 5 as fixing shaft sleeve 530 with internal female threads (integrally formed with the second fixing shaft cover 528), may pass through the second flange bore 523 and into (or into and through) the boss bore 513 of the first boss 506 of the first fixing member 114, thereby immobilizing the first toolhead 102 at the first angle 110 selected by the user.

Thereafter, according to the example of FIG. 5, the fixing shaft male threaded member 534 of the first fixing shaft cover 106 may be threaded into the fixing shaft sleeve 530 with internal female threads. The first fixing shaft cover 106 may be rotated to secure the fixing shaft male threaded member 534 into the fixing shaft sleeve 530 with internal female threads. The carriage bolt feature 526, and therefore the fixing shaft sleeve 530 with internal female threads may be prevented from rotating due to it having been received in the second flange bore 523. A device, for example, such as a hex wrench (not shown) may be inserted into a device receiving feature 536 of the first fixing shaft cover 106, to rotate the fixing shaft male threaded member 534 of the first fixing shaft cover 106 to either insert or withdraw the fixing shaft male threaded member 534 from the fixing shaft sleeve 530 with internal female threads. According to some aspects, the fixing shaft sleeve 530 with internal female threads and the carriage bolt feature 526 may be integrally formed with second fixing shaft cover 528. According to some aspects, the fixing shaft male threaded member 534 may be integrally formed with the first fixing shaft cover 106. Other hardware and/or different orientations and/or configurations of hardware, which may be used to fix a fixing shaft (e.g., like the fixing shaft sleeve 530 with internal female threads) in coaxial alignment with the pinion center axis 532 and the boss bore center axis 512 are within the scope of the disclosure.

In overview, a garden implement, such as the garden implement 100 of FIG. 1, may include a handle 112 having spaced apart handle ends (see, e.g., first handle end 502), at least one toolhead 102 comprising a tool member 103 and a pair of flanges 519a, 519b coupled to and extending from the tool member 114, each flange 519a, 519b including a flange bore 521, 523 defined by a flange internal sidewall 522, 524 and a pinion segment 516a, 516b having a common first center with the flange bore, the pair of flanges 519a, 519b having opposing parallel flange surfaces each including the pinion segment and having a pinion center axis 532 intersecting the common first center and perpendicular to the opposing parallel flange surfaces, the opposing parallel flange surfaces spaced apart by a predetermined first distance, at least a first fixing member 114 coupled between the pair of flanges 519a, 519b and a respective handle end 502, the first fixing member 114 including: a first boss 506 projecting along a longitudinal axis 508 relative to the first fixing member 114, the first boss 506 having parallel first boss surfaces 510a, 510b spaced apart by the predetermined first distance, a first boss bore 513 defined by a first boss internal sidewall 515, and a first boss bore center axis 512 intersecting a first boss bore center and perpendicular to the parallel first boss surfaces 510a, 510b, each respective first boss surface 510a, 510b having a curved rack segment 518a (see also curved rack segments 618a, 618b) projecting perpendicularly therefrom and configured to mesh with at least a portion of the pinion segment 516a, 516b, and a fixing shaft (see, e.g., fixing shaft sleeve 530) insertably received in at least one flange bore 521, 523 and the first boss bore 513 following coaxial alignment of the pinion center axis 532 and the first boss bore center axis 512.

Figures 6A, 6B, 6C:
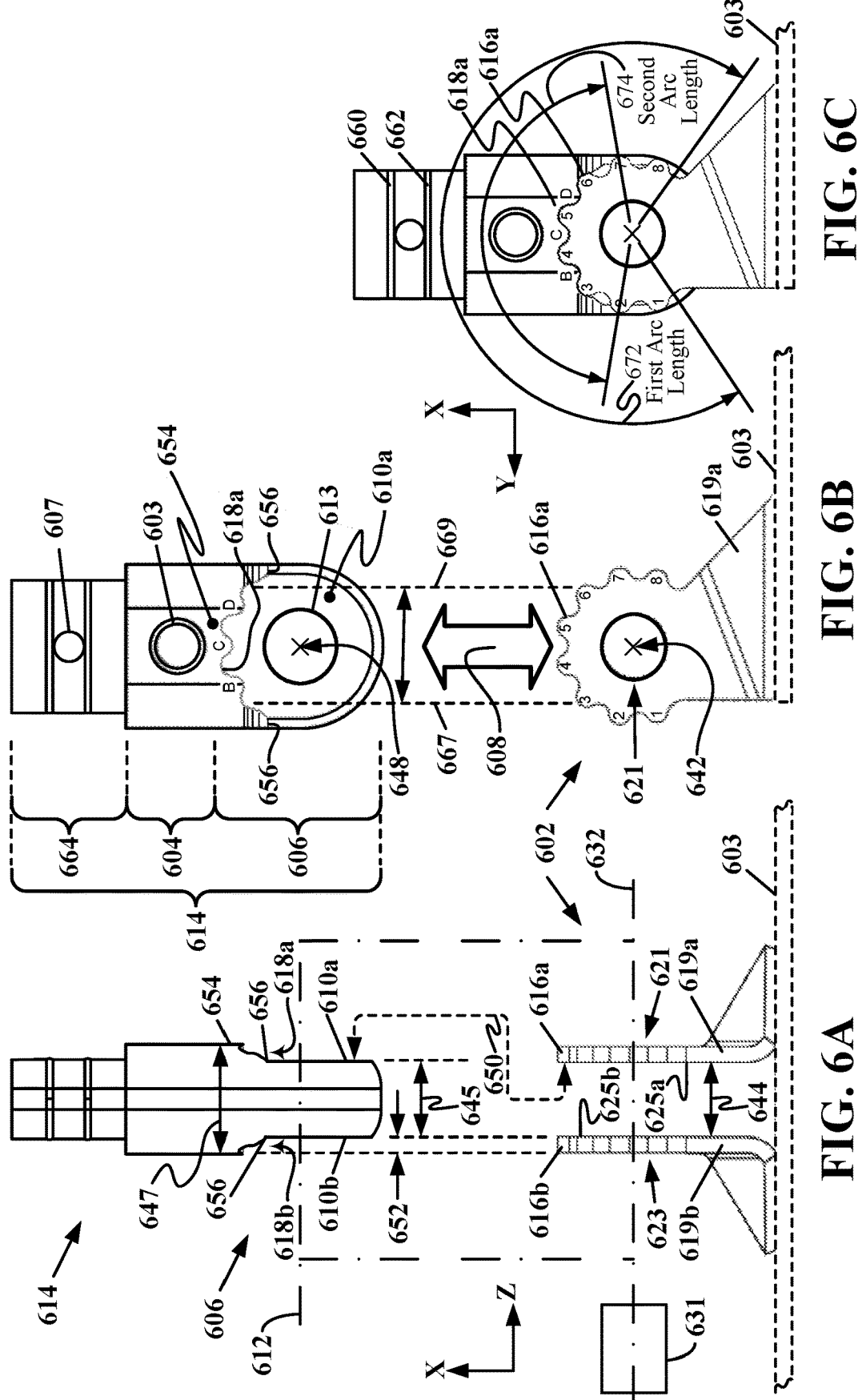
FIG. 6A is a left side elevation view of a fixing member and an interchangeable toolhead of a garden implement in a spaced apart orientation according to some aspects of the disclosure.
FIG. 6B is a top plan view of the fixing member and the interchangeable toolhead of FIG. 6A.
FIG. 6C is a top plan view of the fixing member and the interchangeable toolhead of FIG. 6A and FIG. 6B according to some aspects of the disclosure.

FIG. 6A is a left side elevation view of the fixing member 614 and an interchangeable toolhead 602 of a garden implement in a spaced apart orientation according to some aspects of the disclosure. The garden implement may be similar to the garden implement 100 of FIG. 1 and/or the garden implement 200 of FIG. 2. FIG. 6B is a top plan view of the fixing member 614 and the interchangeable toolhead 602 of FIG. 6A. FIG. 6C is a top plan view of the fixing member 614 and the interchangeable toolhead of FIG. 6A and FIG. 6B according to some aspects of the disclosure. In FIG. 6C, the fixing member 614 was longitudinally translate along the longitudinal axis 606 to slidingly engage the first boss 606 of the fixing member 614 between a pair of opposing parallel flange surfaces 625a, 625b of the interchangeable toolhead 602. FIG. 6C may represent one possible angular orientation (e.g., one possible angle of rotation) between the interchangeable toolhead 602 and the fixing member 614 (or, more particularly, between interchangeable toolhead 602 and the pair of flanges 619a, 619b). As depicted in FIG. 1A, an angle (e.g., first angle 110, second angle 128) between the interchangeable toolhead 602 (e.g., a coupled assembly of the first toolhead 102 and flanges, or of the second toolhead 104 and flanges) and the fixing member (e.g., the first fixing member 114, that second fixing member 120) may be changeably fixed by a user. The angle (e.g., first angle 110, second angle 128) may be measured relative to a longitudinal axis (e.g., 508 of FIG. 5, 608 of FIG. 6B) extending from the fixing member. FIG. 6A, FIG. 6B, and FIG. 6C may be referred to individually or collectively as FIG. 6 herein.

Each of FIG. 6A, FIG. 6B, and FIG. 6C depicts a portion of the interchangeable toolhead 602. The interchangeable toolhead 602 includes a tool member 603 that is drawn in dashed line to indicate that the tool member 603 could be any type of tool member. For example, the tool member 603 may be a working part (separate from its handle) of a hoe, a shovel, a trowel, or any other type of object or structure used for a particular purpose, including any type of gardening tool. The previous list is exemplary and non-limiting.

A pair of flanges (e.g., first flange 619a and second flange 619b) may extend from the tool member 603. Generally both flanges of the pair of flanges 619a, 619b extend from one side of the tool member 603 as shown in the exemplary illustration; however, subject to further spatial relationships described below, both flanges are not limited to extending from one side of the tool member 603. The pair of flanges 619a, 619b may be coupled to the tool member 603 by, for example, welding or brazing.

Each of the pair of flanges 619a, 619b may include a respective flange bore. In the example of FIG. 6, first flange 619a incudes the first flange bore 621 and second flange 619b includes the second flange bore 623. The first flange bore 621 and the second flange bore 623 may collectively be referred to as the first pion gear segment bore herein. The first flange bore 621 and the second flange bore 623 may each be defined by internal sidewalls of the first flange 619a and the second flange 619b (not identified in FIG. 6). Furthermore, each of the pair of flanges 619a, 619b may include a pinion segment 616a, 616b. The pair of pinion segments 616a, 616b may be individually or collectively referred to as the pinion segment 616 herein.

In the example of FIG. 6, the first pinion segment 616a may include a plurality of first teeth and the second pinion segment 616b may include a corresponding plurality of first teeth. The first pinion segment 616a and the second pinion segment 616b may be formed in the first flange 619a and the second flange 619b, for example, stamping, broaching, cold forging, or hot forging, among other techniques.

The first flange bore 621 and the pinion segment 616a may have a common first center 642. The second flange bore 623 and its corresponding pinion segment 616b may have a common second center (not shown). A common flange bore axis (referred to herein as a pinion center axis 632) may intersect the first center 424 and the second center (not shown).

The pair of flanges 619a, 619b may have opposing parallel flange surfaces 625a, 625b, respectively. The opposing parallel flange surfaces 625a, 625b may include at least each respective pinion segment 616a, 616b and first flange bore 621 and second flange bore 623. The pinion center axis 632 may intersect the first center 424 and the second center (not shown), as described above, and may also be perpendicular to the opposing parallel flange surfaces 625a, 625b. The opposing parallel flange surfaces 625a, 625b may be spaced apart by a predetermined first distance 644.

A garden implement, such as the garden implement 100 of FIG. 1, may include two fixing members, such as first fixing member 114 and second fixing member 120 of FIG. 1. As illustrated herein, the first fixing member 114 may be coupled, between the pair of flanges 619a, 619b at respective handle ends (see, for example, first handle end 502 of FIG. 5). FIG. 6, illustrates one fixing member, i.e., the fixing member 614, without a handle 112, to avoid cluttering the drawing.

The fixing member 614 may include a first boss 606 projecting along the longitudinal axis 608 relative to the fixing member 614. The longitudinal axis 608 and translational directions of motion along the longitudinal axis 608 are both represented by the broad double headed arrow in FIG. 6B.

The first boss 606 may have a parallel pair of boss surfaces 610a, 610b spaced apart by the first boss width 645. Clearance may be considered for manufacturing, such that the predetermined first distance 644 and the first boss width 645 are substantially the same yet allow the first boss 606 to be slidingly received between the pair of flanges 619a, 619b.

The first boss 606 may have a boss bore 615 defined by an internal sidewall (not identified in FIG. 6) of the first boss 606. A boss bore center axis 612 may intersect a boss bore center 648 and may be perpendicular to the parallel pair of boss surfaces 610a, 610b. Each of the parallel pair of boss surfaces 610a, 610b may have a respective curved rack segment 618a, 618b extending perpendicularly from the respective one of the parallel pair of boss surfaces 610a, 610b. For ease of reference, the curved rack segments 618a, 618b may be referred to individually or collectively as the curved rack segment 618 herein.

FIG. 6A also depicts a fixing shaft assembly 630. The fixing shaft 631 may be insertably received in at least one of the first flange bore 621 or the second flange bore 623 and the boss bore 615 following coaxial alignment of the pinion center axis 632 and the boss bore center axis 612 following a longitudinal translation of the first boss 606 along the longitudinal axis 608 between the opposing parallel flange surfaces 625a, 625b and following an engagement of the respective pinion segments 616a, 616b with the respective curved rack segments 618a, 618b. The double headed dashed arrow 650 denotes a slideability of a first of the opposing parallel flange surfaces 625a over the boss surfaces 610a. A similar double headed arrow to denotes a slideability of a second of the opposing parallel flange surfaces 625b over the boss surface 610b is omitted to avoid cluttering the drawing.

A pair of parallel dashed lines in FIG. 6A represent a thickness 652 of the second pinion segment 616b (e.g., a thickness of the portion of the second flange 619b that includes the second pinion segment 616b. The thickness 652 of the second pinion segment 616b may be equal to a thickness of the first pinion segment 616a; however, different thicknesses are within the scope of the disclosure. According to some aspects, the combined thicknesses of the first pinion segment 616*a*, the second pinion segment 616*b* and the first boss 606 may be approximately equal to a body segment width 647 of the body segment 604 of the fixing member 614. According to some aspects, the first pinion segment 616*a* thickness measured between parallel opposing first pinion segment surfaces may be less than or equal to a maximum height (measured along the z-axis in FIG. 6) between a boss surface (e.g., boss surface 610*a*) outer surface 654 of the first boss 606 or the body segment 604 adjacent to a respective handle end.

In FIG. 6B and FIG. 6C, each of the plurality of first teeth of the first pinion segment 616*a* are numbered from 1 to 8. Similarly, the outer boss surface 654 of the first boss 606 and/or the body segment 604 of the fixing member 614 are labeled with the letters B, C, and D, which correspond to a plurality of second teeth of the curved rack segment 618*a*. As illustrated in FIG. 6A and FIG. 6B, the outer surface 654 of the first boss 606 may taper down to the boss surface 610*a*. The taper may prevent interference between any of the plurality of first teeth of the pinion segment 616*a* with any of the plurality of second teeth of the curved rack segment 618*a*. As can be seen from the illustration, particularly in the locations identified with dashed lines 667 and 669, if the curved rack segment 618 had full height of the outer surface 654 of the first boss 606 throughout the second arc length 674 (see FIG. 6C) available to the plurality of second teeth of the curved rack segment 618, then the outermost teeth (e.g., in positions corresponding to A, which are counterclockwise from B and to E, which are clockwise from D), which are eliminated in FIG. 6 to reflect an aspect of the disclosure, would interfere with teeth 3 and 6 of the first pinion segment 616*a*. The interference would prevent the first of the opposing parallel flange surfaces 625*a* of the first pinion segment 616*a* from translating along the boss surface 610*a* in a direction of the longitudinal axis 608 to a point where at least a portion of the first pinion segment 616*a* (e.g., a subset of the plurality of first teeth, labeled 3, 4, 5, and 6, of the first pinion segment 616*a*) from meshing with the at least a portion of the curved rack segment 618*a* proximal to the body segment 604 (e.g., at least a subset of the plurality of second teeth, labeled B, C, D, of the curved rack segment 618*a*). In this circumstance, due to the interference, coaxial alignment of the boss bore center axis 612 with the pinion center axis 632 would be prevented and the fixing shaft 631 would be unable to be received within the at least one flange bore 623 and the boss bore 615. Accordingly, those teeth, which would have restricted a width of a path toward engagement of the pinion segment 616*a* with the curved rack segment 618*a* to an unacceptable width 670 are removed from the curved rack segment 618*a*. Removal may be accomplished as a step function (e.g., an abrupt reduction in height of the eliminated teeth, or as a tapered function (e.g., as depicted in FIG. 6), or as any function that prevents interference such as that shown and described herein.

According to some aspects, and as indicated above, each respective pinion segment 616*a*, 616*b* may be a segment of a first pinion gear or a first circular or non-circular curve having a first arc length 672 as depicted in FIG. 6C and each respective curved rack segment 618 may be a segment of an internal gear or a ring gear having teeth that face inward toward a center of the ring) having the second arc length 674 as depicted in FIG. 6C. The first arc length 672 may be greater than the second arc length 674. As used herein, the arc length is a distance along an arc, where an arc is part of the circumference of a circle (as illustrated in FIG. 6C), or a distance long a part of any circular or non-circular curve.

In some examples, a subset of the plurality of second teeth (e.g., a number of plurality of second teeth that is less than a total number of the plurality of second teeth of the curved rack segment 618 along the second arc length 674 that would prevent any of the plurality of first teeth (denoted as tooth 1 to tooth 8) of the pinion segment 616 along the first arc length 672 from translating in a direction along the longitudinal axis 608 to be received within troughs between the plurality of second teeth (e.g., between tooth B and tooth C, between tooth C and tooth D) may be removed (partially or completely) from along the second arc length 674 to avoid such interference. For illustrative purposes, three teeth (labeled B, C, D) along the second arc length 674 of the curved rack segment 618 are identified in FIG. 6B and FIG. 6C. The teeth that would have been labeled A and E (not shown) lie within a zone of the first boss 606 that is depicted as tapering down from a maximum (e.g., widest point or substantially a widest point) of the outer surface 654 of the first boss 606 to a spaced apart edge 656 (e.g., a point) of that is adjacent to and lies on the boss surface 610*a*. The tapering is shown in profile in FIG. 6A (see diminishing width zone between ref. nos. 654 and 656) and as a series of spaced apart horizontal lines above ref. no. 656 in FIG. 6B.

In some examples, the first pinion segment 616*a* may have a plurality of first teeth (e.g., teeth 1 to 8) having a first angular pitch and the first curved rack segment 618*a* may be a segment of an internal gear (not explicitly identified as such in FIG. 6, but represented as including tooth B, tooth C, and tooth D) having a plurality of second teeth (e.g., teeth B, C, and D) having the first angular pitch (i.e., the same pitch as the plurality of first teeth of the first pinion segment 616*a*), where the plurality of first teeth may be greater than the plurality of second teeth, and the engagement of the pinion segment 616*a* with the curved rack segment 618 comprises inserting (e.g., meshing to a complete or maximum available depth) at least some of the plurality of first teeth into troughs between at least some of the plurality of second teeth.

According to some aspects, a first angle (not shown, e.g., a reference or base line for the first angle) of the pinion segment 616*a* relative to a point on a surface of the tool member 603, where, for example, the first angle may be referenced to a line (not shown) intersecting the common first center 642 and any point on a surface of the tool member 603) is fixed and a second angle (e.g., first angle 110 of FIG. 1 or second angle 129 of FIG. 1) between the first angle and the longitudinal axis 608 may be changed after removal of the fixing shaft 631 from the first boss 606 and the pair of flanges 619*a*, 619*b* (or any one of them if the fixing shaft 631 was received in only the one of them). In some aspects, the second angle (e.g., first angle 110 of FIG. 1 or second angle 129 of FIG. 1) between the first angle and the longitudinal axis 608 may be changed after (e.g., only after) removal of the fixing shaft 631 from the first boss 606 and the pair of flanges 619*a*, 619*b* (or any one of them if the fixing shaft 631 was received in only the one of them), disengaging the pinion segment 616 from the curved rack segment 618 by longitudinal translation of the first boss 606 along the longitudinal axis 608 between the opposing parallel flange surfaces 625*a*, 625*b*, rotating the pinion segment 616 relative to the curved rack segment 618, longitudinal translation of the first boss 606 along the longitudinal axis 608 between the opposing parallel flange surfaces 625*a*, 625*b* to reengage the pinion segment 616 with the curved rack segment 618, re-receiving (in the first boss 606 and the pair of flanges 619a, 619b, or any one of them) the fixing shaft assembly 630 to again coaxially align the pinion center axis 632 and the boss bore center axis 612 (with a center axis of the fixing shaft assembly 630 (shown as being coincident with pinion center axis 632 in the exploded drawing of FIG. 6A.

Returning to FIG. 1, FIG. 5, FIG. 6, and FIG. 7 for reference, a garden implement 100 may include a handle 112 having spaced apart handle ends. The garden implement may also include at least one toolhead including a tool member 103 and a pair of flanges (e.g., first flange 519a and second flange 519b of FIG. 5, first flange 619a and second flange 619b of FIG. 6) coupled to and extending from the tool member 103, each flange may include a flange bore 514 defined by the internal sidewall 515 and a pinion segment (e.g., pinion segment 116a of FIG. 1, first pinion segment 516a and second pinion segment 516b of FIG. 5, first pinion segment 616a and second pinion segment 616b of FIG. 6, and pinion segment 716 of FIG. 7). The pinion segment may have a common first center with the flange bore 514. The pair of flanges may have opposing parallel flange surfaces 625a, 625b of FIG. 6, each including the pinion segment (identified above) and having a pinion center axis 532 intersecting the common first center and perpendicular to the opposing parallel flange surfaces 625a, 625b. The opposing parallel flange surfaces 625a, 625b may be spaced apart by a predetermined first distance 644. The garden implement may also include at least a fixing member 114, 614, 714 that may be coupled between the pair of flanges (as identified above) and a respective handle end.

According to some aspects, the fixing member 114, 614, 714 may include a first boss 506, 606 projecting along a longitudinal axis 508, 608, 708 relative to the fixing member 114, 614, 714, the first boss 506, 606 having spaced apart parallel boss surfaces 510a, 510b, 610a, 610b spaced apart by the predetermined first distance 644. The first boss 506, 606 may include a boss bore 513 defined by the internal sidewall 515, and a boss bore center axis 512, 612 intersecting a first boss bore center and perpendicular to the spaced apart parallel boss surfaces 510a, 510b, 610a, 610b, each respective first boss surface having a curved rack segment (e.g., first curved rack segment 118a, first curved rack segment 518a, first curved rack segment 618a, second curved rack segment 618b, curved rack segment 718) projecting perpendicularly therefrom and configured to mesh with at least a portion of the pinion segment (identified above).

The garden implement may also include a fixing shaft 631, 731 (similar to fixing shaft sleeve 530 with internal female threads of FIG. 5) insertably received in at least one flange bore (e.g., first flange bore 521, second flange bore 523, first flange bore 621, second flange bore 623, the boss bore 513, and the boss bore 613 following coaxial alignment of the pinion center axis 532, 632 and the boss bore center axis 512, 612.

Referring to FIG. 6C, according to some aspects, the pinion segment 616a may have a first arc length 672 and the curved rack segment 618a may have a second arc length 674, where the first arc length 672 is greater than the second arc length 674. According to some examples, the second arc length 674 may be free of any portion of a plurality of second teeth of the curved rack segment 618a that would prevent a slidable engagement of any of a plurality of first teeth of the pinion segment 616a from translating along the longitudinal axis 608 on a respective parallel boss surface 610a, and prevent the any portion of the plurality of first teeth from a meshed engagement with a whole depth of corresponding spaces between teeth (e.g., between any crowns B, C, D of FIG. 6 or adjacent to outboard portions of crowns B and D).

In some examples, the fixing shaft 631 that may be received in the at least one of the second flange bore 623 or the first flange bore 621 and the first boss bore 613 may prevent a translation along the longitudinal axis 608 of the first boss 606 relative to the pair of flanges 619a, 619b. In some examples, the fixing shaft 631 that may be received in the at least one of the second flange bore 623 or that first flange bore 621 and the first boss bore 613 fixedly maintains a meshed engagement of the curved rack segment 618 a, 618b and the at least the portion of the pinion segment 616a, 616b. In still other examples, the fixing shaft 631 may be insertably received in the at least one flange bore 623, 621 and the first boss bore 613 following coaxial alignment of the pinion center axis 632 and the boss bore center axis 612 and following a meshed engagement of the curved rack segment 618a, 618b and the at least the portion of the pinion segment 616a, 616b.

In some examples an angle of the tool member 603 relative to the longitudinal axis 608 may be fixed until after removal of the fixing shaft 631 from the first boss bore 613.

Returning to FIG. 1, the handle 112 may be subdivided into at least three serially coupled handle segments including: a first segment 126 having the first fixed length 138 and a first end coupled to the first fixing member 114 and a first opposing end distal to the first end, a second segment 130 having the fixed second length 142 and a second end coupled to a second fixing member 120 and a second opposing end distal to the second end, and a center segment 132 having the fixed center length 140 coupled between the first opposing end of the first segment 126 and the second opposing end of the second segment 130 at respective ends of the center segment 132. In some aspects, a fixed third angle 134, between the center segment 132 and the first segment 126 is a first acute angle and a fixed fourth angle 136, between the center segment 132 and the second segment 130 is a second acute angle. In some examples, the first acute angle and the second acute angle result in the first segment 126 and the second segment 130 being angled toward one side of the center segment 132. According to one aspect, the first segment 126, the center segment 132, and the second segment 130 may be formed as one continuous piece. Additionally, the fixed third angle 134 may be equal to the fixed fourth angle 136.

Referring to FIG. 2, in some aspects, at least two or more of the first segment 226, the center segment 232, and the second segment 230 may be formed as separate pieces, and coupling between the at least two or more of the first segment 226, the center segment 232, and the second segment 230 may also include first inter-segment angle fixing feature 207 and the second inter-segment angle fixing feature 209 configured to be fixed at any one of a plurality of angles provided within a range of the fifth angle 234, the sixth angle 236 ranging at least between plus and minus 90 degrees relative to the center segment 232, inclusive.

Returning to FIG. 1, in some examples, each of the pair of fixing members (e.g., first fixing member 114, second fixing member 120) may also include a second boss 664 of FIG. 6 extending away from the first boss 606. The second boss 664 may be configured to couple to the respective end of the handle 112 of FIG. 1, for example. According to some aspects, the second boss 664 may be configured to fit into a hollow space in the handle 112. The garden implement 100 may also include at least one fixing member (such as first rivet 306 and the rivet sleeve 307) configured to be received in a through hole 607 formed in and through the handle 112 and the second boss 664.

FIG. 7A is a top plan view of a fixing member 714 (similar to fixing member 614 of FIG. 6), a toolhead 702 (similar to the interchangeable toolhead 602 of FIG. 6), and a portion a handle 712 (similar to handle 112 of FIG. 1) of a garden implement (such as the garden implement 100 of FIG. 1) according to some aspects of the disclosure. A second boss 764 is shown in phantom view for scale and orientation. The second boss 764 projects from the body segment of the fixing member toward and into a hollow space in the handle 712.

In FIG. 7A the toolhead 702 is rotated from a nominal orientation shown in FIG. 7B by a first predetermined angular distance 701 clockwise relative to a longitudinal axis 708. A fixing shaft 731 is depicted as being received in coaxial alignment with a bore defined by internal sidewalls of the boss of the fixing member 714 and a bore defined by internal sidewalls of at least one flange of the toolhead 702. The fixing shaft 731 received in the boss bore and the at least one flange bore prevents a translation along the longitudinal axis of the first boss relative to the pair of flanges. The lateral translation would involve the sliding of facing and opposing flange surfaces along adjacent boss surfaces. According to some aspects, the fixing shaft 731 received in the at least one flange bore and the boss bore fixedly maintains a meshed engagement of the curved rack segment 718 and at least the portion of the pinion segment 716. According to some aspects, the fixing shaft 731 may be insertably received in the at least one flange bore and the boss bore following coaxial alignment of the pinion center axis and the boss bore center axis following a meshed engagement of the curved rack segment 718 and the at least the portion of the pinion segment 716.

In the example of FIG. 7A, pinion segment 716 tooth 1 is received in the partial space width located counterclockwise from tooth B of the curved rack segment 718. In the example of FIG. 7A, the angular pitch between adjacent tooth crowns and adjacent tooth roots may be represented by the angular segment X 720 in degrees. In the example of FIG. 7A, X is about 31 degrees. Other values of X are within the scope of the disclosure. Each reorientation of the pinion segment 716 by one pinion segment tooth position results in a corresponding orientation change of the toolhead 702. Reorientation clockwise by X degrees from that depicted in FIG. 7A may cause a portion of the flange to interfere with the fixing member 714. Reorientation counterclockwise in by an X degree increment (i.e., by one tooth) allows for the pinion segment 716 tooth 2 to occupy the partial space counterclockwise from tooth B of the curved rack segment 718. An additional reorientation counterclockwise by an X degree increment allows for the pinion segment 716 tooth 3 to occupy the partial space counterclockwise from tooth B of the curved rack segment 718. This orientation is exemplified in FIG. 7B.

FIG. 7B is a top plan view of the fixing member 714 and the toolhead 702 of FIG. 7A, where the toolhead 702 is in a "nominal" orientation. In the nominal orientation, tooth 3 of pinion segment 716 occupies the partial space counterclockwise from tooth B of the curved rack segment 718. In the nominal orientation, a plane parallel to the tool member 703 of the toolhead 702 is perpendicular to the longitudinal axis 708 and perpendicular to a corresponding longitudinal axis (not shown) extending from the end of the handle; that is, from the end of the handle 712 where the second boss 764 is located. Various ways to describe the angular orientation of the toolhead 702 with respect to the handle 712. It is noted that not all toolheads may extend perpendicularly from their flanges as does the toolhead 702 of FIG. 7. Accordingly, for consistency herein, and without any limitation, angles of the toolheads described herein may be based on angular distance of the tool member 703 of the toolhead 702 having a nominal orientation that is perpendicular to the longitudinal axis 708 extending from the boss of the fixing member 714.

From the nominal orientation of FIG. 7B, reorientation clockwise by an X degree increment (i.e., by one tooth) allows for tooth 4 of the pinion segment 716 to occupy the partial space counterclockwise from tooth B of the curved rack segment 718. An additional reorientation counterclockwise by an X degree increment allows for tooth 5 of the pinion segment 716 to occupy the partial space counterclockwise from tooth B of the curved rack segment 718. This orientation is exemplified in FIG. 7C.

FIG. 7C is a top plan view of the fixing member 714 and the toolhead 702 of FIG. 7B, where the toolhead 702 is rotated from the nominal orientation of FIG. 7B to a maximum angular displacement 705 counterclockwise. Further reorientation of the toolhead 702 in the counterclockwise direction would result in the flange interfering with the fixing member 714. A different design of the flange, which may clear the fixing member if the toolhead was incremented, for example by another X degree increment counterclockwise from the position shown in FIG. 7C, or clockwise from the position shown in FIG. 7A is within the scope of the disclosure.

In the examples from FIG. 7A to FIG. 7C, the exemplary toolhead 702 having the exemplary pinion segment 716 in a meshed engagements with the exemplary curved rack segment 718 may be reoriented from a starting position angle clockwise relative to the longitudinal axis 708 through to the ending position angle counterclockwise relative to the longitudinal axis 708. The example therefore depicts a total of 5 available orientations including the starting orientation for a total angular reorientation capability of about 124 degrees. The orientations and angular segment X 720 values are illustrative and non-limiting. Other angular segment X 720 values that are greater or lesser than the example of about 31 degrees provided herein are within the scope of the disclosure. An increase in the angular segment X 720 may result in a fewer number of teeth in both the pinion segment 716 and the curved rack segment 718. A decrease in the angular segment X 720 may result in a greater number of teeth in both the pinion segment 716 and the curved rack segment 718. A tradeoff between angular segment X 720 value (and corresponding numbers of teeth) and resistance to torque forces about the pinion axis and the coaxial boss bore axis that may damage (e.g., strip) teeth may be considered.

FIG. 7D is a top plan view of the fixing member 714 and the toolhead 702 of FIG. 7C, where the toolhead 702 was removed from the fixing member, rotated about the longitudinal axis 708, and reinstalled to the fixing member 714 according to some aspects of the disclosure. The reorientation of the toolhead was accomplished by rotating the toolhead from pointing toward the right, to pointing toward the left. Note that the orientation of the handle 712 is not changed in FIGS. 7A, 7B, 7C, and 7D. Only the toolhead 702 is rotated in FIG. 7D. The ability to reorient the toolhead 702 according to this aspect provides for additional range of angular orientation capability relative to the handle 712.

Figure 8A:
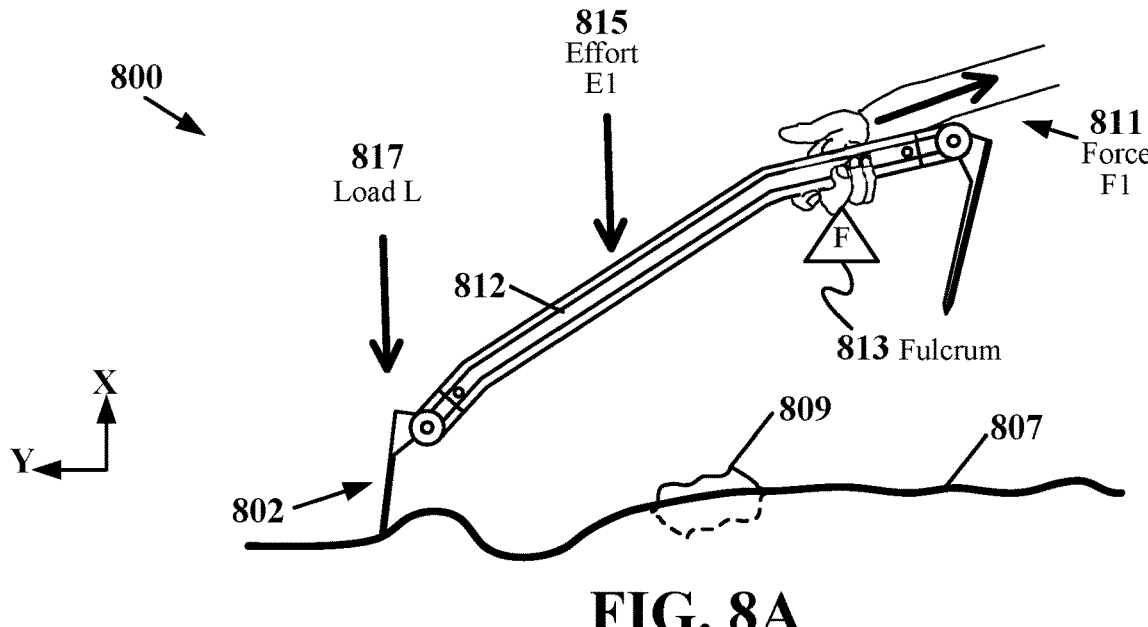
FIG. 8A is a garden implement with a first fixed orientation of a toolhead relative to the handle of the garden implement according to some aspects of the disclosure.

FIG. 8A is a garden implement 800 (similar to garden implement 100 of FIG. 1) with a first fixed orientation of a toolhead 802 relative to the handle 812 of the garden implement 800 according to some aspects of the disclosure.

The angle of the toolhead 802 relative to the handle 812 may be fixed in a clockwise direction from a nominal orientation and used for a first purpose. For example, the toolhead 802 may be a hoe and the first purpose may be to scrape or rake a surface of a plot of soil 807 to level the surface. A human hand and forearm (e.g., a user's right hand and forearm) are illustrated. For example, a mound of soil to the right of the toolhead 802 may be scraped or raked into the depression to the right of the mound of soil by pulling on the handle 812 in the direction of the first force 811 (denoted as F1). An exerted effort 815 (denoted as E1) (e.g., a force) may be exerted downward on the midpoint of the handle 812. The exerted effort 815 may be applied by the user's left hand (not shown). In this way, with the first orientation of the toolhead 802 relative to the handle 812 fixed, the garden implement 800 may be used as a third class lever. The fulcrum 813 of the third class lever is located at the illustrated user's right hand, the exerted force is exerted as effort 815 downward at the midpoint of the handle 812, and the load 817 (denoted as L) is moved downward at the end of the handle 812 (e.g., at the toolhead 802) according to some aspects of the disclosure.

Figure 8B:
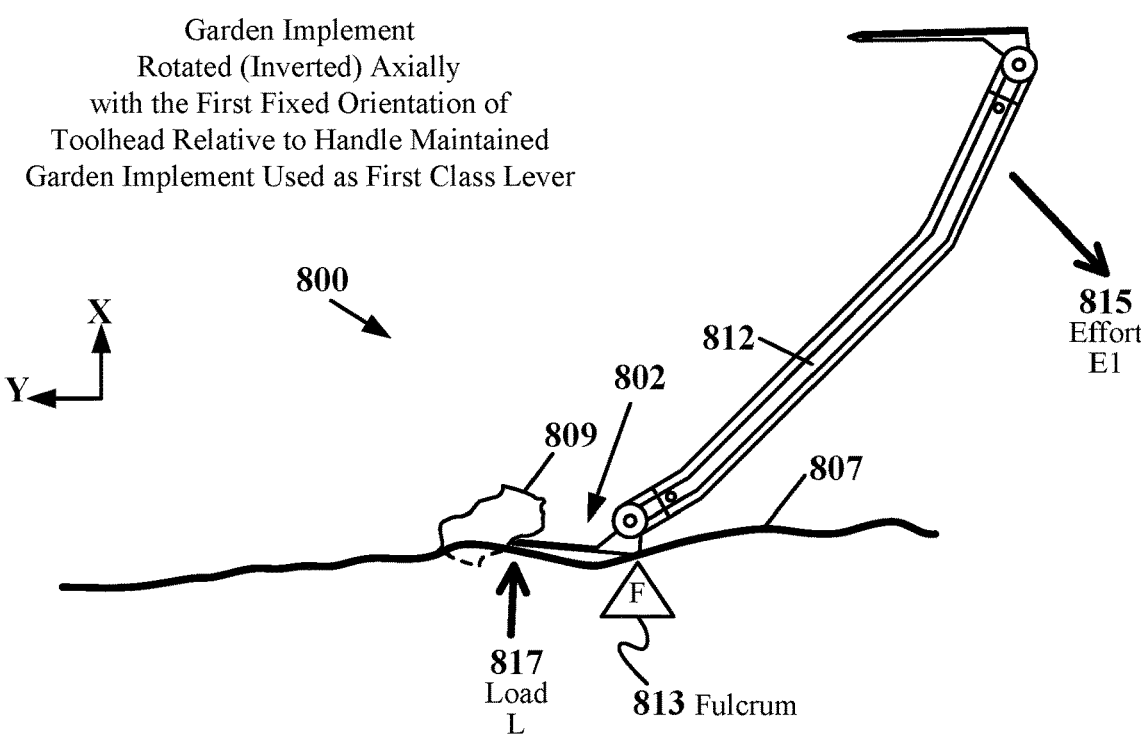
FIG. 8B is the garden implement of FIG. 8A where the handle was rotated (e.g., inverted) from the orientation shown in FIG. 8A.

FIG. 8B is the garden implement 800 of FIG. 8A where the handle 812 was rotated (e.g., inverted) from the orientation shown in FIG. 8A. That is, the user rotated the handle 812 about the axis (not shown) of the center segment of the handle 812 to flip or invert the handle 812 and the toolhead 802 by 180 degrees from the orientation shown in FIG. 8A. The angle of the toolhead 802 relative to the handle 812 is maintained at the same first fixed orientation depicted in FIG. 8A. The toolhead 802 is not changed; it is still a hoe. However, the garden implement 800 is now used for a second purpose; namely, the garden implement 800 of FIG. 8B may be used as a lever to pry a rock 809 from the plot of soil 807. An exerted effort 815 may be exerted against the end of handle 812 distal from the soil 807 in substantially the direction as shown. One or both of the user's hands may pull or push the end of handle 812 distal from the soil 807 to exert the effort 815. The fulcrum 813 is now located at the end of the handle 812 proximal to the soil 807 (e.g., located at the toolhead 802). The load 817 may now be lifted from the soil 807 in the direction shown by the application of the exerted effort 815 on the handle 812 as shown. In this way, with the first orientation of the toolhead 802 relative to the handle 812 fixed and maintained, the garden implement 800 may be used as a third class lever. An ability to utilize one toolhead 802 with a fixed or changed angle relative to the handle 812 of the garden implement 800, as two distinct classes of a machine (e.g., a first class lever and a third class lever) is an unexpected benefit of the angular orientations of the center segment of the handle 812 relative to the first and second segments of the handle 812.

FIG. 9A is a first garden implement 900 having a first handle 912*a* with a first center segment 932*a* having a first center length, La, according to some aspects of the disclosure. The first handle 912*a* includes a first segment 926 and a second segment 930 in addition to the first center segment 932*a*. According to one example, the first center length, La, may be about 52 inches.

FIG. 9B is a second garden implement 901 having a second handle 912*b* with a second center segment 932*b* having a second center length, Lb, according to some aspects of the disclosure. The second handle 912*b* includes a first segment 926 and a second segment 930 in addition to the second center segment 932*b*. According to one example, the second center length, Lb, may be about 40 inches.

FIG. 9C is a third garden implement 902 having a third handle 912*c* with a third center segment 932*c* having a third center length, Lc, according to some aspects of the disclosure. The third handle 912*c* includes a first segment 926 and a second segment 930 in addition to the third center segment 932*c*. According to one example, the third center length, Lc, may be about 23 inches.

FIG. 9D is a fourth garden implement 903 having a fourth handle 912*d* with a fourth center segment 932*d* having a fourth center length, Ld, according to some aspects of the disclosure. The fourth handle 912*d* includes a first segment 926 and a second segment 930 in addition to the fourth center segment 932*d*. According to one example, the fourth center length, Lc, may be about 16 inches.

As depicted visually, and described in the examples, the first center length, La, is greater than the second center length, Lb. The second center length, Lb, is greater than the third center length. Lc. The third center length. Ld, is greater than the fourth center length, Ld. The lengths may vary. A selection of various lengths provides for garden implements 900, 901, 902, 903 that can exert different forces on loads based on the center lengths of the handles of the garden implements. The exertion of different forces based on center lengths may become pertinent when, for example, the garden implements are used as levers. It is noted that even a rake is a lever; specifically, a rake is a third class lever. The first segment 926 and second segment 930 may each be the same structures (and respective same lengths) in the first garden implement 900, the second garden implement 901, the third garden implement 902 and the fourth garden implement 903. According to one example, the first segment 926 may be about 3-5 inches and the second segment may be about 8-10 inches. The preceding examples are illustrative and non-limiting.

Examples of garden tools include, for example, a border spade having a flat rectangular blade that may be used for digging in spaces having cramped or restricted access; a bow rake having a bow-shaped frame that connects the teeth of the rake to a handle; a border fork having tines that are narrowly spaced and that may be used, for example, for weeding; a border spade that may be a specialized tool member that may be smaller than other types of spades and may have a flat blade, for example, for digging; a bulb planter that may be used to dig holes for bulbs and may subsequently be used to replace that soil to cover the planted bulb; a compost fork that may have spaced apart tines and may be used, for example, to turn over manure or to move mulch; a flat rake with strong teeth connected to a flat back that may be used, for example, for removing rocks and other unwanted material from soil and for spreading and leveling soil and mulch; a garden hoe that may have a small rectangular blade used, for example, to shape soil, remove weeds, clear soil, and harvest root crops; a garden shovel that may have a round, pointed or flat digging edge and may be used, for example, for digging, lifting, and/or moving soil; a hoe having a thin rectangular or square blade and that may be used, for example, to break up clumps of soil for weeding; a leaf rake having flat fan-shaped resilient tines that may radiate outward from a handle; a pick mattock having a pointed end and a spaced apart adze-like end distal from the pointed end that may be used, for example, for digging, carving, and/or chopping soil; a pitchfork or garden fork having a small number of spaced apart tines and that may be used, for example, to lift and toss loose material such as straw or hay; a planting dibble having a pointed tip that may be used, for example, to form holes in soil; a pointed shovel having a pointed tip that may be used, for example, as a digging shovel; a potato fork that may have curled tines and may be useful, as the name implies, for harvesting potatoes; a round point shovel that may have a curved blade with a tip that comes to a point and that may be used, for example, for scooping; a scoop shovel having a wide forward edge with a large flat surface with upward tending rear and side wall and that may be useful, for example, for scooping up a large quantity of matter when digging or moving that matter; a scuffle hoe that has a flat broad blade used parallel to the surface of the soil with sharpened leading and trailing edges that may cut plant life (e.g., typically grass or weeds) from the surface of the soil during forward and backward motion of the flat brad blade; a soil scoop that may be a general purpose digging implement with a bowl-shaped body and pointed and/or serrated edges; a square point shovel that may be used to dig into and lift loose matter, such as sand, loose topsoil, and pebbles, for example; a step edger that may be a sharpened semi-circular disc at the end of a handle and that may be used, for example, straighten edges of lawns by, for example, trimming off the edges of the lawn that has grown over some boundary, such as a sidewalk; a transplant spade that may have a narrow, sometimes pointed digging edge and a long narrow bed that is the same width as the digging edge and may be used, for example, to deeply penetrate the soil and lift out large plants; a trench shovel (also called a clean out shovel or excavator shovel) having a long, narrow blade with a sharpened curved digging edge and may be used, for example, to dig or clean out trenches; a trowel, which in the context of gardening is typically a small curved scoop-like shovel-like implement that may be used, for example, for digging small holes to receive plants and/or for transferring small amounts of matter (e.g., soil, fertilizer) from a bag to a gardening pot or a garden bed, for example; a twist tiller configured with long twisted tines that may be used to simultaneously till soil and remove weeds by rotating the twist tiller within the soil; a warren hoe, also known as a ridging hoe, or drill hoe, which is a triangular or heart-shaped hoe designed for digging narrow furrows or shallow trenches for planting seeds or bulbs; a common weeder that is configured to remove weeds from soil; and a wheel edger that may be a sharpened circular disk on a transvers axis that is free to rotate about the axis as the wheel edger is pushed along, cutting away an edge, for example, of a lawn between the lawn and a sidewalk to establish a boundary therebetween. The preceding list is exemplary and non-limiting. Any tool member capable of being interchangeably fixed to the garden implement described herein is within the scope of the disclosure.

Figure 10A:
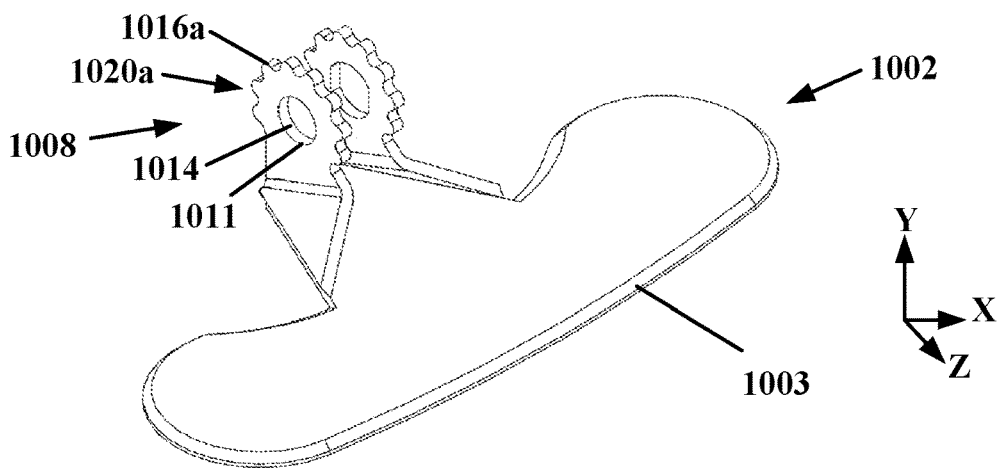
FIG. 10A is an illustrative example of a first interchangeable toolhead according to some aspects of the disclosure.

FIG. 10A is an illustrative example of a first interchangeable toolhead 1002 according to some aspects of the disclosure. The first interchangeable toolhead 1002 may be referred to as a cultivator toolhead and may be used in association with tasks typically associated with cultivator-type tools.

Figure 10B:
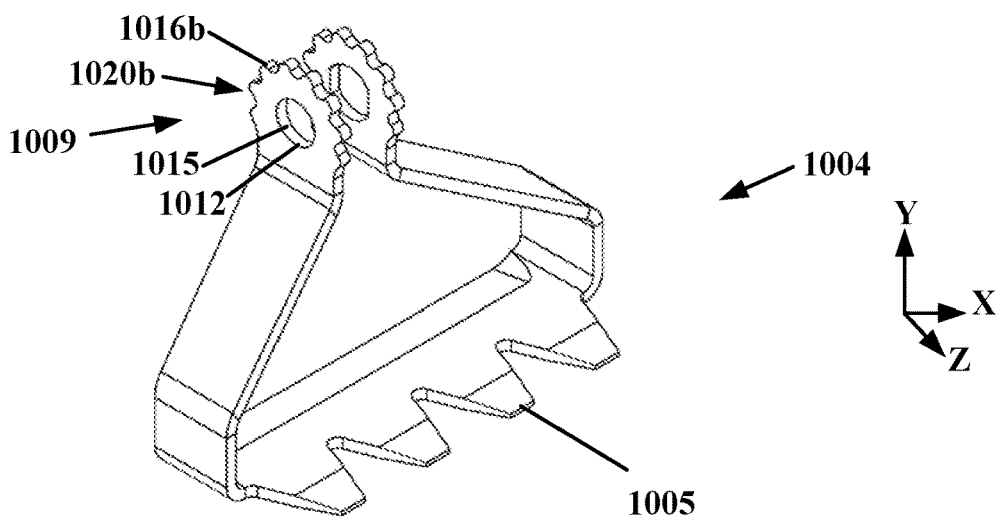
FIG. 10B is an illustrative example of a second interchangeable toolhead according to some aspects of the disclosure.

FIG. 10B is an illustrative example of a second interchangeable toolhead 1004 according to some aspects of the disclosure. The second interchangeable toolhead 1004 may be referred to as a push-pull rake toolhead and may be used in association with tasks typically associated with push-pull rake-type tools.

Figure 10C:
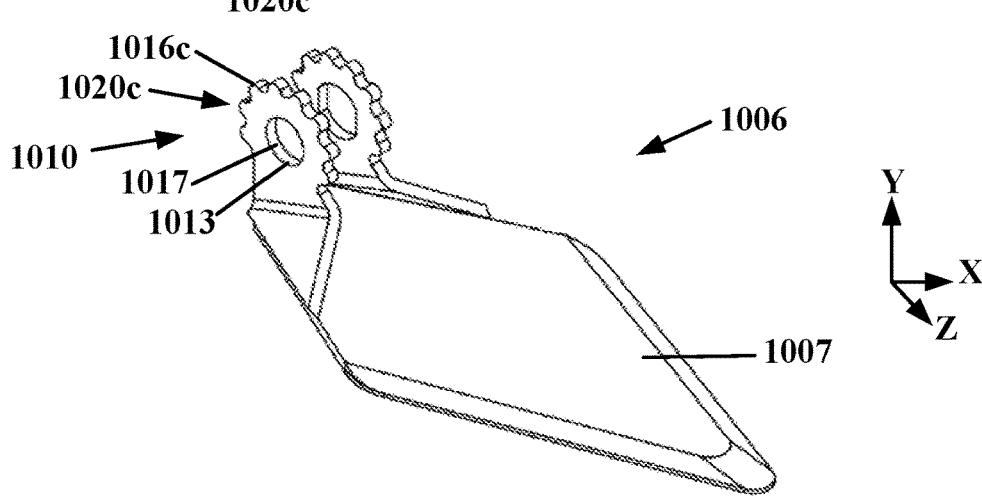
FIG. 10C is an illustrative example of a third interchangeable toolhead according to some aspects of the disclosure.

FIG. 10C is an illustrative example of a third interchangeable toolhead 1006 according to some aspects of the disclosure. The third interchangeable toolhead 1006 may be referred to as a spade toolhead and may be used in association with tasks typically associated with spade-type tools.

The illustrative examples of FIGS. 10A, 10B, and 10C are exemplary and non-limiting. any number of garden tools, such as those described above, may be fitted with flanges configured to receive a boss of a fixing member of a garden implement as described herein. The toolheads described herein are interchangeable toolheads.

The spaced apart flanges having respective flange bores defined by internal sidewalls of the respective flanges are exemplified in each of the first interchangeable toolhead 1002, the second interchangeable toolhead 1004, and the third interchangeable toolhead 1006. In the examples, one of the flange bore is circular and the other flange bore has flattened or straight surfaces truncating the otherwise circular bore. The flattened or straight surface serve as stops against which a portion of a fixing shaft (not shown) might rest. The configuration may prevent the fixing shaft from rotating in configurations where, for example, a nut is screwed onto the fixing shaft or a threaded male member is screwed into a female threaded portion of the fixing shaft. Other shapes that may server as stops against which the portion of the fixing shaft might rest are within the scope of the disclosure.

According to some aspects. an interchangeable toolhead 1002, 1004, 1006 may include a tool member 1003, 1005, 1007. The interchangeable toolhead 1002, 1004, 1006 may also include a pair of flanges 1008, 1009, 1010 extending from the tool member 1003, 1005, 1007. Each flange may include a flange bore 1011, 1012, 1013 defined by a flange internal sidewall 1014, 1015, 1017 and a pinion segment 1016a, 1016b, 1016c having a common first center with the flange bore 1011, 1012, 1013, the pair of flanges 1008, 1009, 1010 having opposing parallel flange surfaces including at least the respective pinion segment 1016a, 1016b, 1016c and a having a pinion center axis (e.g., pinion center axis 532 of FIG. 5, pinion center axis 632 of FIG. 6) intersecting the common first centers and perpendicular to the opposing parallel flange surfaces, the opposing parallel flange surfaces spaced apart by a predetermined first distance (e.g., 644 of FIG. 6). According to some examples, the predetermined first distance may correspond to a width (e.g., first boss width 645) of a boss (e.g., first boss 606) coupled to and extending from a handle 112 of a garden implement 100.

In some examples, the pinion segment 1016a, 1016b, 1016c may have a plurality of first teeth 1020a, 1020b, 1020c having a first angular pitch (e.g., angular segment X 720 of FIG. 7A). The first teeth of the pinion segment may be configured to mesh with a curved rack segment (e.g., 718 of FIG. 7) having a plurality of second teeth (e.g., 721 of FIG. 7) having the first angular pitch, where the plurality of first teeth 1020a, 1020b, 1020c is greater than the plurality of second teeth 721 of FIG. 7. Furthermore, an angle of the toolhead 702 of FIG. 7 relative to the handle 712 may be determined based on which of the plurality of first teeth 1020a, 1020b, 1020c may be in a meshed engagement with the plurality of second teeth 721. The determination may be made when the pinion center axis 532, 632 is coaxially aligned with the boss bore center axis 512, 612. In some examples, at least a portion of first teeth 1020a, 1020b, 1020c of the pinion segment 1016a, 1016b, 1016c may be configured to mesh with second teeth 721 of a curved rack segment 718 coupled to a handle 112 of a garden implement 100. In some examples, the pinion segment 1016a, 1016b, 1016c may a first arc length (e.g., first arc length 672 of FIG. 6C) and the curved rack segment 618 has a second arc length (e.g., second arc length 674 of FIG. 6), where the first arc length 672 is greater than the second are length 674.

Figure 11:
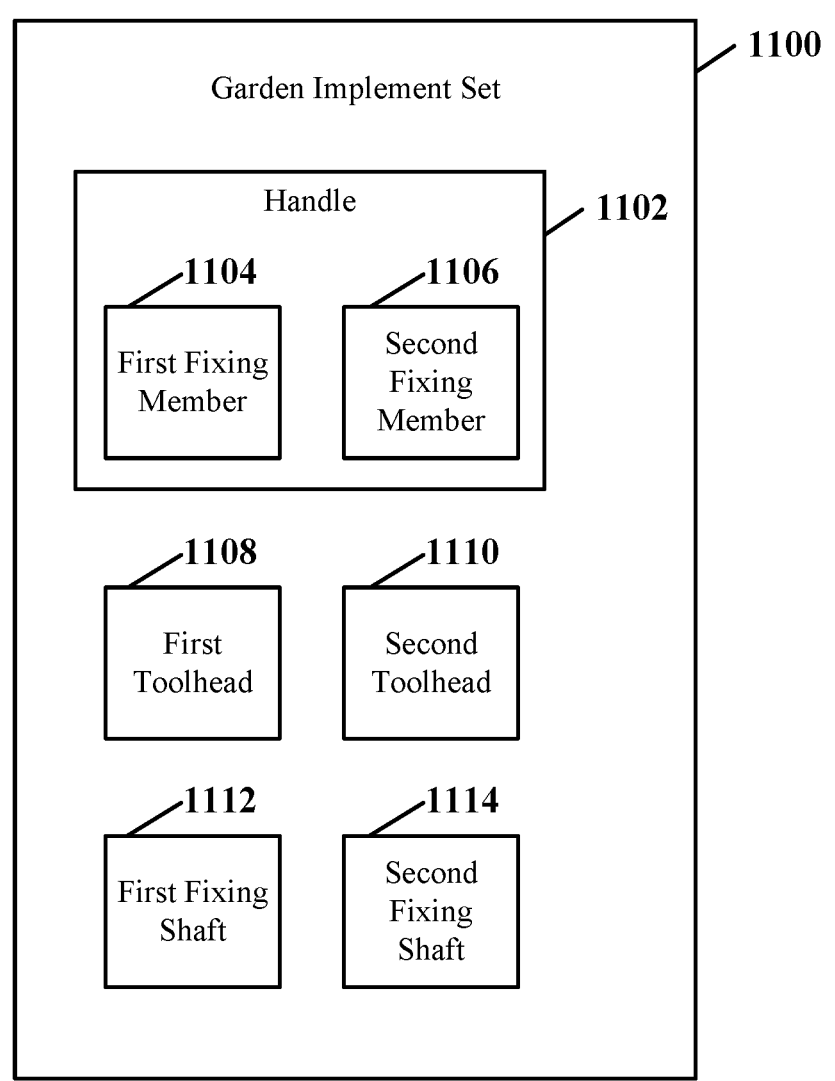
FIG. 11 is a graphical representation of plurality of articles of manufacture packaged as a garden implement set according to some aspects of the disclosure.

FIG. 11 is a graphical representation of plurality of articles of manufacture packaged as a garden implement set 1100 according to some aspects of the disclosure. The plurality of articles of manufacture include a handle 1102 having spaced apart handle ends, at least two toolheads (e.g., a first toolhead 1108 and a second toolhead 1110) each having a tool member and a pair of flanges coupled to and extending from the tool member, the pair of flanges including opposing parallel flange surfaces spaced apart by a predetermined first distance, at least two fixing members (e.g., a first fixing member 1104 and a second fixing member 1106) each fixed to respective handle ends and configured to couple the handle 1102 to a respective one of the at least two toolheads (e.g., the first toolhead 1108 and the second toolhead 1110), and at least two fixing shafts (e.g., a first fixing shaft 1112 and a second fixing shaft 1114), each configured to be insertably received in a first fixing shaft receiver of a respective toolhead (e.g., the first toolhead 1108 and the second toolhead 1110) and a second fixing shaft receiver of a respective fixing member (e.g., the first fixing member 1104 and the second fixing member 1106) when the fixing shaft, first fixing shaft receiver, and second fixing shaft receiver are coaxially aligned.

According to some aspects, the first fixing shaft receiver of the respective toolhead may include a flange bore defined by a respective flange internal sidewall of each respective flange, each respective flange may further include a pinion segment having a common center with the flange bore and a pinion segment center axis. Each of the at least two fixing members (e.g., first fixing member 1104 and second fixing member 1106) may further include a respective boss having a curved rack segment configured to mesh with at least a portion of the pinion segment. Still further the second fixing shaft receiver of the respective fixing member may include a boss bore defined by a respective boss internal sidewall, and a boss bore center axis.

In some examples, the at least two fixing members (e.g., first fixing member 1104 and second fixing member 1106) may each include a first boss projecting along a longitudinal axis relative to the respective fixing member, the first boss having parallel first boss surfaces spaced apart by the predetermined first distance, a first boss bore defined by a first boss internal sidewall, and a first boss bore center axis intersecting a first boss bore center and perpendicular to the parallel first boss surfaces, each respective first boss surface having a curved rack segment projecting perpendicularly therefrom and configured to mesh with at least a portion of a pinion segment of the pair of flanges. The pinion segment may have a first arc length and the curved rack segment may have a second arc length, where the first arc length is greater than the second arc length. Still further, the second arc length may be free of any portion of a plurality of second teeth of the curved rack segment that would prevent a slidable engagement of any of a plurality of first teeth of the pinion segment from translating along the longitudinal axis on a respective parallel boss surface, and prevent the any portion of the plurality of first teeth from a meshed engagement with spaces between any crowns of the plurality of second teeth.

One or more of the components, features, and/or functions illustrated in FIGS. 1-11 may be rearranged and/or combined into a single component, feature or function or embodied in several components, features, or functions. Additional elements, components, and/or features may also be added without departing from the disclosure.

The word "exemplary" is used herein to mean "serving as an example, instance, or illustration." Any implementation or aspect described herein as "exemplary" is not necessarily to be construed as preferred or advantageous over other implementations or aspects described herein.

Likewise, the term "aspects" does not require that all aspects of the disclosure include the discussed feature, advantage, or mode of operation.

The term "coupled" is used herein to refer to the direct or indirect coupling between two objects. For example, if object A physically touches object B, and object B touches object C, then objects A and C may still be considered coupled to one another—even if they do not directly physically touch each other.

The construct of "at least one of A or B" is intended to cover A, B, and A and B. The construct of "A and/or B" is likewise intended to cover A, B, and A and B.

While the foregoing disclosure shows illustrative embodiments, it should be noted that various changes and modifications could be made herein without departing from the scope of the disclosure as defined by the appended claims. The functions, steps and/or actions described herein or represented in any method claims in accordance with the embodiments described herein need not be performed in any particular order. Furthermore, although elements of embodiments may be described or claimed in the singular, the plural is contemplated unless limitation to the singular is explicitly stated.

The previous description of the disclosed aspects is provided to enable any person skilled in the art to make or use those aspects as presented above and in the claims that follow. Various modifications to these aspects will be readily apparent to those skilled in the art, and the generic principles defined herein may be applied to other aspects without departing from the spirit or scope of the invention. Thus, the present disclosure is not intended to be limited to the aspects shown herein but is to be accorded the widest scope consistent with the principles and novel features disclosed herein.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A garden implement, comprising:
a handle having spaced apart handle ends;
a fixing member, projecting from at least one of the spaced apart handle ends, including:
a boss with a boss surface projecting along a fixing member longitudinal axis and a boss bore defined by a boss internal sidewall, and
a curved rack segment, having a plurality of rack teeth projecting perpendicularly from the boss surface, arranged in a semi-circle along a minor arc between edges of the boss with rack teeth crowns radiating toward a boss bore center axis, and having a maximum height at a midpoint of the minor arc and a minimum height at both ends of the minor arc, the maximum height and the minimum height both measured perpendicularly from the boss surface;

at least one flange, removably coupled to the fixing member, including:

a flange surface and a flange bore defined by a flange internal sidewall, and a curved pinion segment, having a plurality of pinion teeth with pinion teeth crowns radiating away from a flange bore center axis, the curved pinion segment having an arc length that is greater than 180 degrees; and a fixing shaft removably received in the boss bore and the flange bore following a first sliding contact between opposing ones of the boss surface and the flange surface along the fixing member longitudinal axis and a meshed engagement of the curved rack segment with at least a portion of the curved pinion segment, wherein the curved rack segment is configured to maximize a surface area in contact with the at least the portion of the curved pinion segment in the meshed engagement.

2. The garden implement of claim 1, wherein the arc length of the curved pinion segment is greater than a length of the minor arc of the curved rack segment.

3. The garden implement of claim 1, wherein rack teeth of the plurality of rack teeth at the both ends of the minor arc are free of respective portions that prevent the first sliding contact between the opposing ones of the boss surface and the flange surface and the meshed engagement.

4. The garden implement of claim 1, wherein removal of the fixing shaft from at least one of the boss bore and the flange bore precedes a disengagement, by a second sliding contact between the opposing ones of the boss surface and the flange surface along the fixing member longitudinal axis, of the meshed engagement of the curved rack segment with the at least the portion of the curved pinion segment.

5. The garden implement of claim 1, further comprising: an object coupled to the at least one flange, distal from the flange bore and the curved pinion segment.

6. The garden implement of claim 5, wherein the object is a tool member.

7. The garden implement of claim 1, wherein an angular pitch between crests of adjacent teeth in the plurality of rack teeth is selected to obtain an integer number of complete teeth plus partial valleys adjacent to complete teeth closest to the both ends of the minor arc.

8. The garden implement of claim 1, wherein the handle is subdivided into at least three serially coupled handle segments including:

a first segment having a first length, a first end including the fixing member, and a first opposing end distal to the first end;

a second segment having a second length, a second end, and a second opposing end distal to the second end; and a center segment having a center length coupled between the first opposing end of the first segment and the second opposing end of the second segment at respective ends of the center segment, wherein a first angle between the center segment and the first segment is a first acute angle, a second angle between the center segment and the second segment is a second acute angle, and the first acute angle and the second acute angle result in the first segment and the second segment being angled toward one side of the center segment.

9. The garden implement of claim 8, wherein the first segment, the center segment, and the second segment are formed as one continuous piece.

10. The garden implement of claim 8, wherein the first acute angle is equal to the second acute angle.

11. The garden implement of claim 1, wherein the boss surface is a first boss surface, and the boss further includes:

a second boss surface projecting along the fixing member longitudinal axis, parallel to and spaced apart from the first boss surface by a predetermined distance, wherein the boss bore is open to and extends between the first boss surface and the second boss surface.

12. The garden implement of claim 11, wherein the at least one flange is a first flange, the flange surface of the first flange is a first flange surface, and the garden implement further comprises:

a second flange removably coupled to the fixing member, including:

a second flange surface and a second flange bore defined by a second flange internal wall, and the first flange surface is parallel to and is spaced apart from the second flange surface by at least the predetermined distance.

13. The garden implement of claim 12, wherein the first flange surface and the second flange surface are configured to slide along the first boss surface and the second boss surface, respectively, parallel to the fixing member longitudinal axis, to obtain the meshed engagement of the curved rack segment with the at least the portion of the curved pinion segment.

14. A joint configured to be fixed at any one of a plurality of predetermined angles, comprising:

a fixing member, including:

a boss with a boss surface projecting along a fixing member longitudinal axis and a boss bore defined by a boss internal sidewall, and a curved rack segment, having a plurality of rack teeth projecting perpendicularly from the boss surface, arranged in a semi-circle along a minor arc between edges of the boss with rack teeth crowns radiating toward a boss bore center axis, and having a maximum height at a midpoint of the minor arc and a minimum height at both ends of the minor arc, the maximum height and the minimum height both measured perpendicularly from the boss surface;

at least one flange, removably coupled to the fixing member, including:

a flange surface and a flange bore defined by a flange internal sidewall, and a curved pinion segment, having a plurality of pinion teeth with pinion teeth crowns radiating away from a flange bore center axis, the curved pinion segment having an arc length that is greater than 180 degrees; and a fixing shaft removably received in the boss bore and the flange bore following a first sliding contact between opposing ones of the boss surface and the flange surface along the fixing member longitudinal axis and a meshed engagement of the curved rack segment with at least a portion of the curved pinion segment, wherein the curved rack segment is configured to maximize a surface area in contact with the at least the portion of the curved pinion segment in the meshed engagement.

15. The joint of claim 14, wherein the arc length of the curved pinion segment is greater than a length of the minor arc of the curved rack segment.

16. The joint of claim 14, wherein rack teeth of the plurality of rack teeth at the both ends of the minor arc are free of respective portions of the rack teeth that prevent the first sliding contact between the opposing ones of the boss surface and the flange surface and the meshed engagement.

17. The joint of claim 14, wherein removal of the fixing shaft from at least one of the boss bore and the flange bore precedes a disengagement, by a second sliding contact between the opposing ones of the boss surface and the flange surface along the fixing member longitudinal axis, of the meshed engagement of the curved rack segment with the at least the portion of the curved pinion segment.

18. The joint of claim 14, wherein an angular pitch between crests of adjacent teeth in the plurality of rack teeth is selected to obtain an integer number of complete teeth plus partial valleys adjacent to complete teeth closest to the both ends of the minor arc.

19. The joint of claim 14, wherein the boss surface is a first boss surface, and the boss further includes:

a second boss surface projecting along the fixing member longitudinal axis, parallel to and spaced apart from the first boss surface by a predetermined distance, wherein the boss bore is open to and extends between the first boss surface and the second boss surface.

20. The joint of claim 19, wherein the at least one flange is a first flange, the flange surface of the first flange is a first flange surface, and the joint further comprises:

a second flange removably coupled to the fixing member, including:

a second flange surface and a second flange bore defined by a second flange internal wall, and the first flange surface is parallel to and is spaced apart from the second flange surface by at least the predetermined distance.

* * * * *